United States Patent
Nakagawa et al.

(10) Patent No.: US 12,506,989 B2
(45) Date of Patent: Dec. 23, 2025

(54) BODY WEARABLE TERMINAL AND INFORMATION PROCESSING SYSTEM

(71) Applicants: Sony Group Corporation, Tokyo (JP); Sony Semiconductor Solutions Corporation, Kanagawa (JP)

(72) Inventors: Kei Nakagawa, Kanagawa (JP); Atsushi Suzuki, Kanagawa (JP); Youji Sakioka, Tokyo (JP); Yusuke Minagawa, Kanagawa (JP)

(73) Assignees: Sony Group Corporation, Tokyo (JP); Sony Semiconductor Solutions Corporation, Kanagawa (JP)

( * ) Notice: Subject to any disclaimer, the term of this patent is extended or adjusted under 35 U.S.C. 154(b) by 83 days.

(21) Appl. No.: 18/701,060

(22) PCT Filed: Oct. 12, 2022

(86) PCT No.: PCT/JP2022/037951
§ 371 (c)(1),
(2) Date: Apr. 12, 2024

(87) PCT Pub. No.: WO2023/068117
PCT Pub. Date: Apr. 27, 2023

(65) Prior Publication Data
US 2024/0348948 A1    Oct. 17, 2024

(30) Foreign Application Priority Data

Oct. 20, 2021  (JP) ................. 2021-171860

(51) Int. Cl.
*H04N 25/779* (2023.01)
*G06T 7/20* (2017.01)
(Continued)

(52) U.S. Cl.
CPC ............. *H04N 25/779* (2023.01); *G06T 7/20* (2013.01); *G06T 7/70* (2017.01); *H04N 25/532* (2023.01)

(58) Field of Classification Search
CPC .. H04N 25/779; H04N 25/532; H04N 23/611; H04N 25/42; H04N 25/771;
(Continued)

(56) References Cited

U.S. PATENT DOCUMENTS 10,194,110 B2 * 1/2019 Gomi ................. H04N 25/65
2020/0029049 A1 * 1/2020 Okura ................. H04N 25/78
(Continued)

FOREIGN PATENT DOCUMENTS

| JP | 2017072560 A | 4/2017 |
| WO | 2020261838 A1 | 12/2020 |
| WO | 2021161712 A1 | 8/2021 |

OTHER PUBLICATIONS

International Search Report (PCT/ISA/210), International Application No. PCT/JP2022/037951, dated Dec. 13, 2022.

*Primary Examiner* — Shahbaz Nazrul
(74) *Attorney, Agent, or Firm* — Michael Best & Friedrich LLP

(57) ABSTRACT

Switching is performed between a global shutter method and a local shutter method. A pixel control unit 30 performs local shutter and global shutter on a pixel. The image generation unit 40 generates a first frame, which is an image based on the first image signal, and a second frame, which is an image based on the second image signal. The self-position estimation unit 50 generates a surrounding map from the first frame. The object detection unit 60 detects a target object from the second frame and generates target object information.

16 Claims, 15 Drawing Sheets

(51) Int. Cl.
*G06T 7/70* (2017.01)
*H04N 25/532* (2023.01)

(58) Field of Classification Search
CPC ...... H04N 25/531; H04N 23/57; H04N 23/61; H04N 23/667; H04N 23/681; H04N 23/684; H04N 25/77; G06T 7/20; G06T 7/70; G06F 3/011; G06F 3/017; G06F 3/0304; G06F 1/163; G06F 3/013
See application file for complete search history.

(56) References Cited

U.S. PATENT DOCUMENTS

| | | |
|---|---|---|
| 2020/0279876 A1 | 9/2020 | Lee |
| 2024/0089635 A1* | 3/2024 | Takayanagi ............ H04N 25/65 |
| 2024/0406600 A1* | 12/2024 | Tsai ..................... H04N 25/616 |
| 2025/0071428 A1* | 2/2025 | Lee ..................... H04N 25/616 |

* cited by examiner

BODY WEARABLE TERMINAL AND INFORMATION PROCESSING SYSTEM

FIELD

The present disclosure relates to a body wearable terminal and an information processing system.

BACKGROUND

An apparatus including an imaging element that generates an image of a subject is used. This apparatus is an apparatus that processes the image generated by the imaging element. The imaging element used in this apparatus is configured by arranging pixels, each of which has a photoelectric conversion element, in a two-dimensional matrix. Furthermore, this imaging element repeats exposure for performing photoelectric conversion of light from the subject and reading of an image signal based on a charge generated by the photoelectric conversion from each of the pixels, thereby outputting a generated image.

In this pixel, the charge generated by the photoelectric conversion during the exposure period is accumulated inside the photoelectric conversion element.

Then, the charge accumulated in the photoelectric conversion element after the lapse of the exposure period is transferred to a charge storage unit. The charge storage unit can be configured by a floating diffusion layer formed by a diffusion region disposed on a semiconductor substrate having the photoelectric conversion element formed thereon. An amplification transistor is connected to the floating diffusion layer, and a signal corresponding to the charge stored in the floating diffusion layer is generated. Such a signal generation method is referred to as a floating diffusion amplifier. It is noted that the floating diffusion layer is reset by a reset unit configured to discharge the charge remaining immediately before the transfer of the charge.

Meanwhile, reading is sequentially performed for each row of the pixels arranged in the two-dimensional matrix. At this time, reading is simultaneously performed in the pixels arranged in one row. As a method of generating such an image, a rolling shutter method and a global shutter method are used.

The rolling shutter method is a method of sequentially performing exposure and reading with a period shifted for each row, and is a method capable of simplifying a configuration of the imaging element. However, since a timing of exposure differs for each row in the rolling shutter method, there is a problem in that distortion occurs in an image when the image of a moving subject is captured.

The global shutter method is a method in which exposure is simultaneously performed in all the pixels and charges generated during the exposure period are stored. The reading is sequentially performed for each row based on the stored charges. Image distortion can be prevented by a global shutter that simultaneously exposes all the pixels. Since it takes time from the end of the exposure period to the reading, the charge is transferred to a second charge storage unit different from the above-described floating diffusion layer, and a signal is generated based on the charge of the second charge storage unit at the time of reading. Since the floating diffusion layer is adjacent to the photoelectric conversion element, there is a problem in that the charge due to leaking incident light is superimposed on the charge of the floating diffusion layer. In order to prevent this deterioration in image quality, the second charge storage unit is required.

In the imaging element adopting the global shutter method, an imaging element in which a capacitive element is applied to the second charge storage unit has been proposed. For example, an imaging element using two capacitive elements as the second charge storage unit has been proposed (refer to, for example, Patent Literature 1).

CITATION LIST

Patent Literature

Patent Literature 1: US 2020/279876 A

SUMMARY

Technical Problem

However, in the above-described conventional technique, there is a problem in that the global shutter method and the local shutter method cannot be switched.

Therefore, the present disclosure proposes a body wearable terminal and an information processing system that perform imaging by performing switching between the global shutter method and the local shutter method.

Solution to Problem

A body wearable terminal according to the present disclosure includes: a pixel array unit having pixels arranged therein in a two-dimensional matrix, the pixel including a light receiving unit configured to expose incident light and to output a voltage level corresponding to an exposure amount, a signal level storage unit configured to store the voltage level output from the light receiving unit, a first image signal generation unit configured to generate a first image signal, which is a signal corresponding to the voltage level stored in the signal level storage unit, and a second image signal generation unit configured to generate a second image signal, which is a signal corresponding to the voltage level output from the light receiving unit; a pixel control unit configured to perform a local shutter and a global shutter, wherein the local shutter sequentially performs, on the pixels, exposure of the incident light in the light receiving unit and generation of the second image signal in the second image signal generation unit based on the voltage level output after the exposure at a timing shifted for each row of the pixel array unit, and the global shutter simultaneously performs, on the pixels arranged in the pixel array unit, the exposure of the incident light in the light receiving unit and storage of the voltage level output after the exposure in the signal level storage unit, and sequentially performs generation of the first image signal in the first image signal generation unit at the timing shifted for each row of the pixel array unit; an image generation unit configured to generate a first frame, which is an image based on the first image signal, and a second frame, which is an image based on the second image signal; a self-position estimation unit configured to generate a surrounding map from the first frame; an object detection unit configured to detect a target object from the second frame so as to generate target object information; a display unit configured to display the surrounding map and the target object information; and a control unit configured to perform first frame generation control, surrounding map generation control, second frame generation control, target object detection control, and display control, wherein the first frame generation control causes the pixel control unit to control the global shutter and causes the image generation unit to generate the first frame, the surrounding map generation control causes the self-position estimation unit to generate the surrounding map, the second frame generation control causes the pixel control unit to control the local shutter and causes the image generation unit to generate the second frame, the target object detection control causes the object detection unit to generate the target object information, and the display control causes the display unit to display the surrounding map and the target object information.

DESCRIPTION OF EMBODIMENTS

Figure 1:
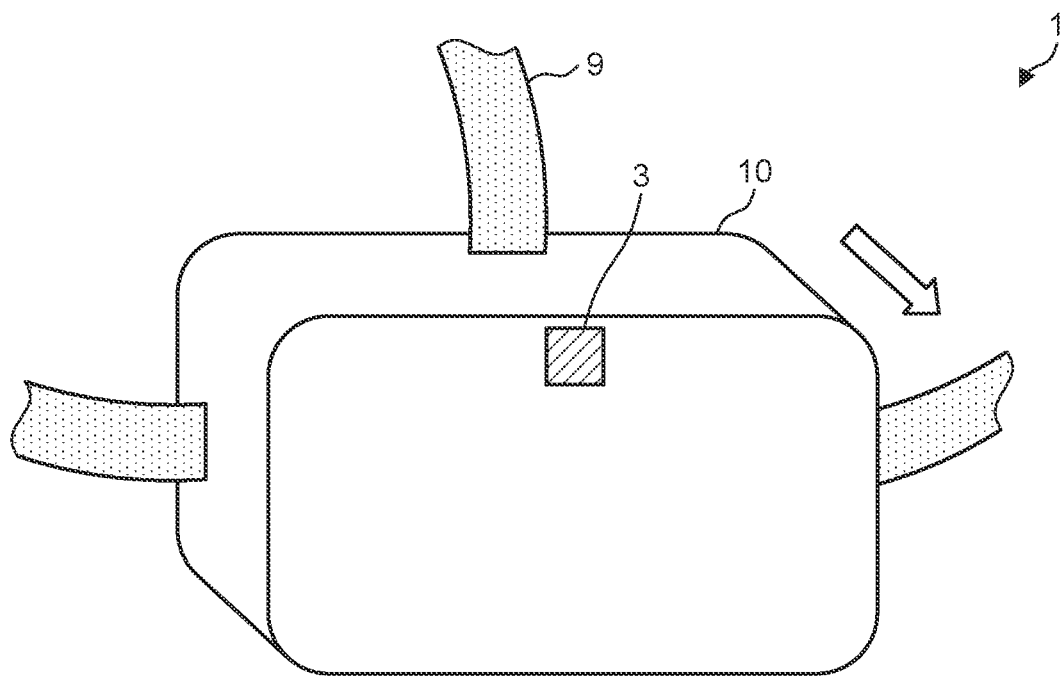
FIG. 1 is a diagram illustrating an example of a body wearable terminal according to a first embodiment of the present disclosure.

Hereinafter, embodiments of the present disclosure will be described in detail with reference to the drawings. The description will be given in the following order. In each of the following embodiments, the same parts are denoted by the same reference numerals, and redundant description will be omitted.

1. First Embodiment
2. Second Embodiment
3. Modification

1. First Embodiment

[Body Wearable Terminal]

FIG. 1 is a diagram illustrating an example of a body wearable terminal according to a first embodiment of the present disclosure. The drawing is a diagram illustrating an appearance of a body wearable terminal 1. Here, the body wearable terminal is referred to as a wearable terminal and is a terminal device used by being mounted on the body.

The drawing illustrates an example of the body wearable terminal 1 configured as a head mounted display (HMD). The head mounted display is a display device mounted on the head. The body wearable terminal 1 in the drawing includes a housing 10 and is fixed to the head of a person using a mounting belt 9 disposed in the housing 10. In addition, a display unit (a display unit 6 to be described later) is provided in the housing 10. An image is displayed on the display unit 6, and an image of augmented reality (AR) or virtual reality (VR) can be displayed to a user.

The back side of the paper surface of the housing 10 of the drawing is used in contact with the face of a person. In addition, the body wearable terminal 1 in the drawing is configured in a shape that covers the eyes of the user and represents an example of blocking a user from the outside world. An imaging element 3 is disposed in the body wearable terminal 1. The imaging element 3 captures an image of the outside world. The imaging element 3 in the drawing is disposed on the front side of the housing 10 and illustrates an example of capturing an image of a subject in a visual field direction of a user. A white arrow in the drawing indicates the direction of a visual field of the user. A new image representing a physical space around the user can be generated using the image of the outside world and displayed on the display unit 6. It is possible to constantly grasp the physical space around the user, to generate an interaction image with the physical space, and to show the interaction image to the user. For example, an image in which an image of a virtual object is superimposed on a surrounding image can be generated and displayed. Such a technique is referred to as mixed reality (MR).

The image around the user can be generated by a simultaneous localization and mapping (SLAM) technique. This SLAM is a technique for performing self-position estimation and environmental map generation based on the image acquired by the imaging element 3. Here, the environmental map generation means generation of a map representing the physical space around the user. Further, the self-position estimation represents estimation of the position of the user on the environmental map. The body wearable terminal 1 in the drawing generates a map around the user (hereinafter referred to as a surrounding map) using the SLAM technique, and displays the surrounding map on the display unit 6. In addition, the body wearable terminal 1 can generate an image by capturing an image of the surroundings of the user, and display the image by superimposing the image on the surrounding map.

[Configuration of Body Wearable Terminal]

Figure 2:
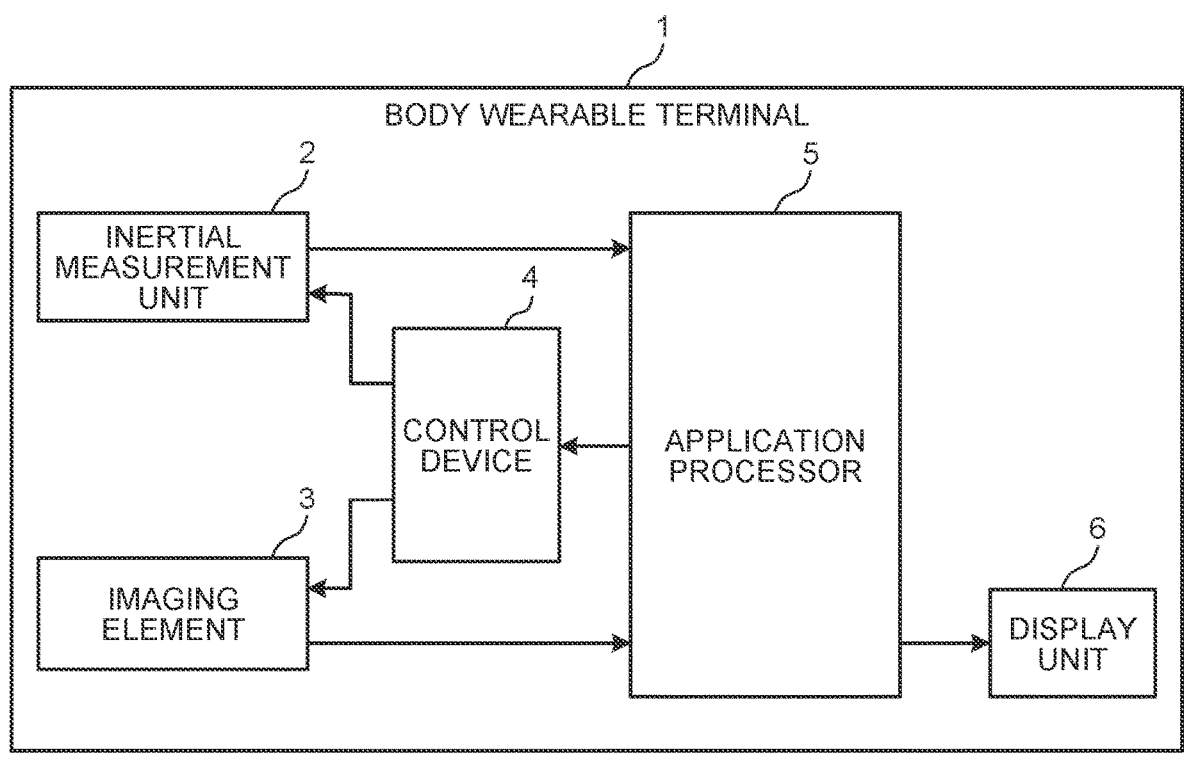
FIG. 2 is a diagram illustrating a configuration example of the body wearable terminal according to the first embodiment of the present disclosure.

FIG. 2 is a diagram illustrating a configuration example of the body wearable terminal according to the first embodiment of the present disclosure. This diagram is a diagram illustrating the configuration example of the body wearable terminal 1. The body wearable terminal 1 includes an inertial measurement unit 2, the imaging element 3, a control device 4, an application processor 5, and a display unit 6.

The inertial measurement unit 2 is also referred to as an inertial measurement unit (IMU) and detects movement of a user. The movement of the user corresponds to, for example, movement, rotation, change in direction, and the like of the user. The inertial measurement unit 2 includes, for example, a gyro sensor and an acceleration sensor in three axis directions, and detects the movement of the user. It is noted that the inertial measurement unit 2 is an example of a movement detection unit described in the claims.

The imaging element 3 captures an image of a subject or the like to generate an image.

The control device 4 controls a hardware unit such as the inertial measurement unit 2 and the imaging element 3. The control device 4 controls detection of movement of a user in the inertial measurement unit 2, and controls imaging of an image of a subject in the imaging element 3.

The application processor 5 controls the entire body wearable terminal 1. In addition, the application processor 5 performs software control and processing in the body wearable terminal 1.

Figure 3:
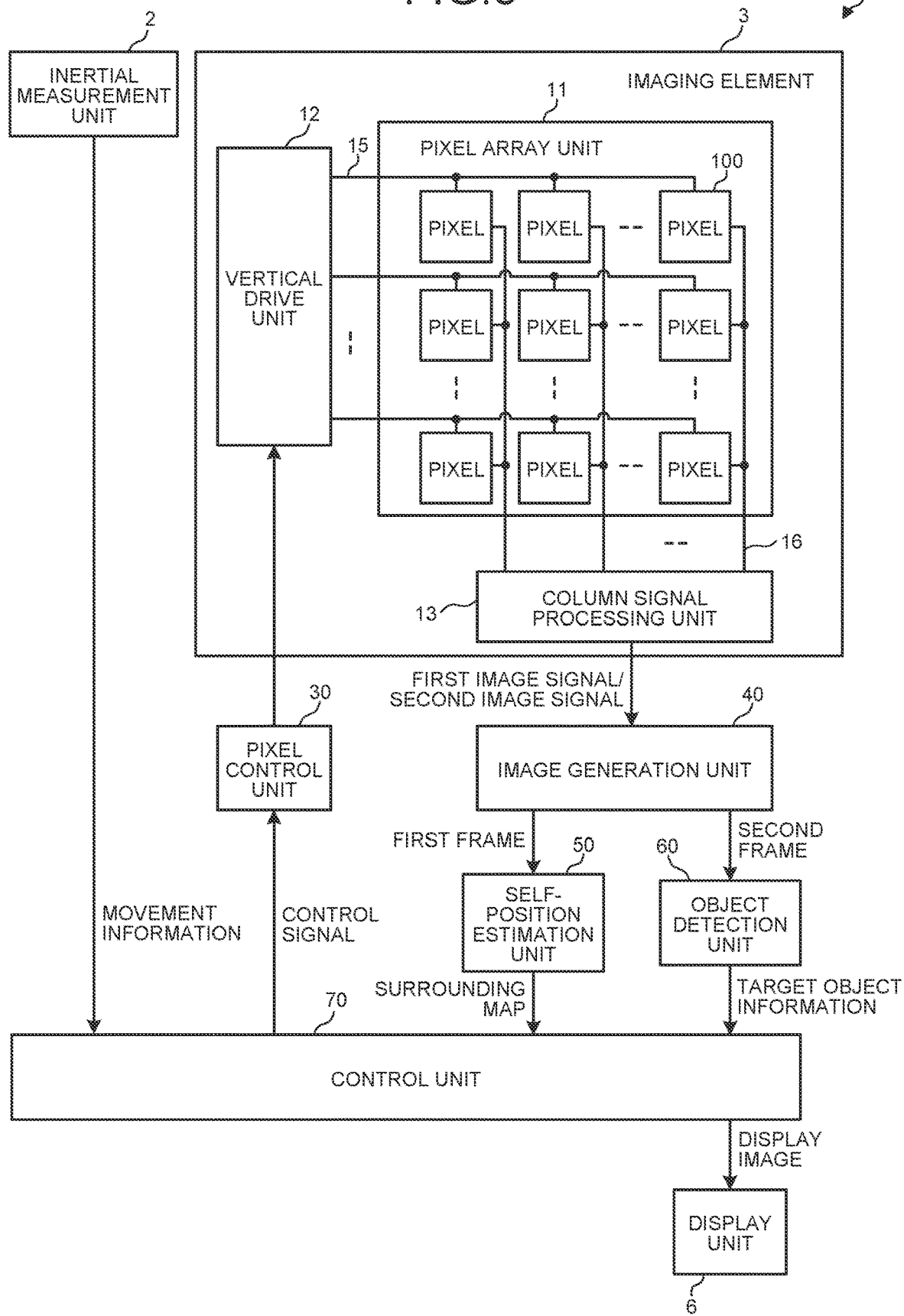
FIG. 3 is a diagram illustrating the configuration example of the body wearable terminal according to the first embodiment of the present disclosure.

FIG. 3 is a diagram illustrating the configuration example of the body wearable terminal according to the first embodiment of the present disclosure. The drawing is a block diagram illustrating the configuration example of the body wearable terminal 1, and is a diagram illustrating blocks representing processing by the application processor 5 and the like described above. The body wearable terminal 1 includes the inertial measurement unit 2, the imaging element 3, a pixel control unit 30, an image generation unit 40, a self-position estimation unit 50, an object detection unit 60, a control unit 70, and the display unit 6. It is noted that the body wearable terminal 1 is an example of an information processing system described in the claims.

The imaging element 3 captures an image of a subject to generate and output an image signal. The imaging element 3 in the drawing includes a pixel array unit 11, a vertical drive unit 12, and a column signal processing unit 13.

The pixel array unit 11 is configured by arranging a plurality of pixels 100 in a two-dimensional matrix. Each of the pixels 100 includes a photoelectric conversion unit that performs photoelectric conversion of incident light, and generates an image signal of a subject based on the emitted incident light. For example, a photodiode can be used as the photoelectric conversion unit. Signal lines 15 and 16 are wired to each of the pixels 100. The pixel 100 is controlled by a control signal transmitted from the signal line 15 to generate an image signal, and outputs the generated image signal via the signal line 16. It is noted that the signal line 15 is arranged for each row of the shape of the two-dimensional matrix, and is commonly wired to the plurality of pixels 100 arranged in one row. The signal line 16 is arranged for each column of the shape of the two-dimensional matrix, and is commonly wired to the plurality of pixels 100 arranged in one column.

The vertical drive unit 12 generates the control signal of the pixel 100 described above. The vertical drive unit 12 in the drawing generates the control signal for each row of the two-dimensional matrix of the pixel array unit 11, and sequentially outputs the control signal via the signal line 15.

The column signal processing unit 13 processes the image signal generated by the pixel 100. The column signal processing unit 13 in the drawing simultaneously processes the image signals from the plurality of pixels 100 arranged in one row of the pixel array unit 11, in which the image signals are transmitted via the signal line 16. As this processing, for example, analog-to-digital conversion for converting an analog image signal generated by the pixel 100 into a digital image signal and correlated double sampling (CDS) for removing an offset error of the image signal can be performed. The processed image signal is output to a circuit or the like outside the imaging element 3.

As described later, the pixel 100 outputs a first image signal and a second image signal. The first image signal is an image signal generated by the above-described global shutter method. In addition, the second image signal is an image signal generated by the local shutter method described above. In this manner, the pixel 100 in the drawing can generate the image signal by performing switching between the global shutter method and the local shutter method. The vertical drive unit 12 in the drawing generates a control signal corresponding to each of the global shutter method and the local shutter method, and outputs the control signal to the pixel 100.

In addition, the column signal processing unit 13 performs the above-described processing on each of the first image signal and the second image signal. It is noted that the column signal processing unit 13 is an example of an image signal processing unit described in the claims.

As described above, the inertial measurement unit 2 detects the movement of the user. The inertial measurement unit 2 in the drawing generates movement information based on the detected movement, and outputs the movement information to the control unit 70.

The pixel control unit 30 controls imaging of the pixel 100. The pixel control unit 30 performs a control operation of switching between the local shutter method and the global shutter method in the pixel 100. Details of the local shutter method and the global shutter method will be described later. The pixel control unit 30 in the drawing performs switching between the local shutter method and the global shutter method of the pixel 100 by controlling the vertical drive unit 12.

The image generation unit 40 generates a frame, which is an image for one screen based on the image signal output from the imaging element 3 (the column signal processing unit 13). The image generation unit 40 generates a first frame based on the first image signal and a second frame based on the second image signal. The generated first frame is output to the self-position estimation unit 50, and the generated second frame is output to the object detection unit 60.

The self-position estimation unit 50 generates a surrounding map by the SLAM technique. The self-position estimation unit 50 generates the surrounding map from the first frame. Details of the generation of the surrounding map by the self-position estimation unit 50 will be described later. The self-position estimation unit 50 outputs the generated surrounding map to the control unit 70.

The object detection unit 60 detects and recognizes a target object among surrounding objects. Here, the target object is an object to be processed by the body wearable terminal 1, and corresponds to, for example, a finger of a person. The object detection unit 60 detects the target object based on the second frame and outputs the target object to the control unit 70 as target object information.

The control unit 70 controls the entire body wearable terminal 1. The control unit 70 can perform first frame generation control that causes the pixel control unit 30 to control the global shutter and causes the image generation unit 40 to generate the first frame, surrounding map generation control that causes the self-position estimation unit 50 to generate the surrounding map, second frame generation control that causes the pixel control unit 30 to control the local shutter and causes the image generation unit 40 to generate the second frame, target object detection control that causes the object detection unit 60 to generate the target object information, and display control that causes the display unit 6 to display the surrounding map and the target object information. Furthermore, the control unit 70 can further perform movement information generation control for causing the inertial measurement unit 2 to generate the movement information.

It is noted that the configuration of the body wearable terminal 1 is not limited to this example. For example, it is also possible to adopt a configuration in which only the imaging element 3 and the inertial measurement unit 2 are arranged in the HMD (inside the housing 10 in FIG. 1). In this case, the remaining blocks are arranged in devices of different housings.

[Configuration of Pixel]

Figure 4:
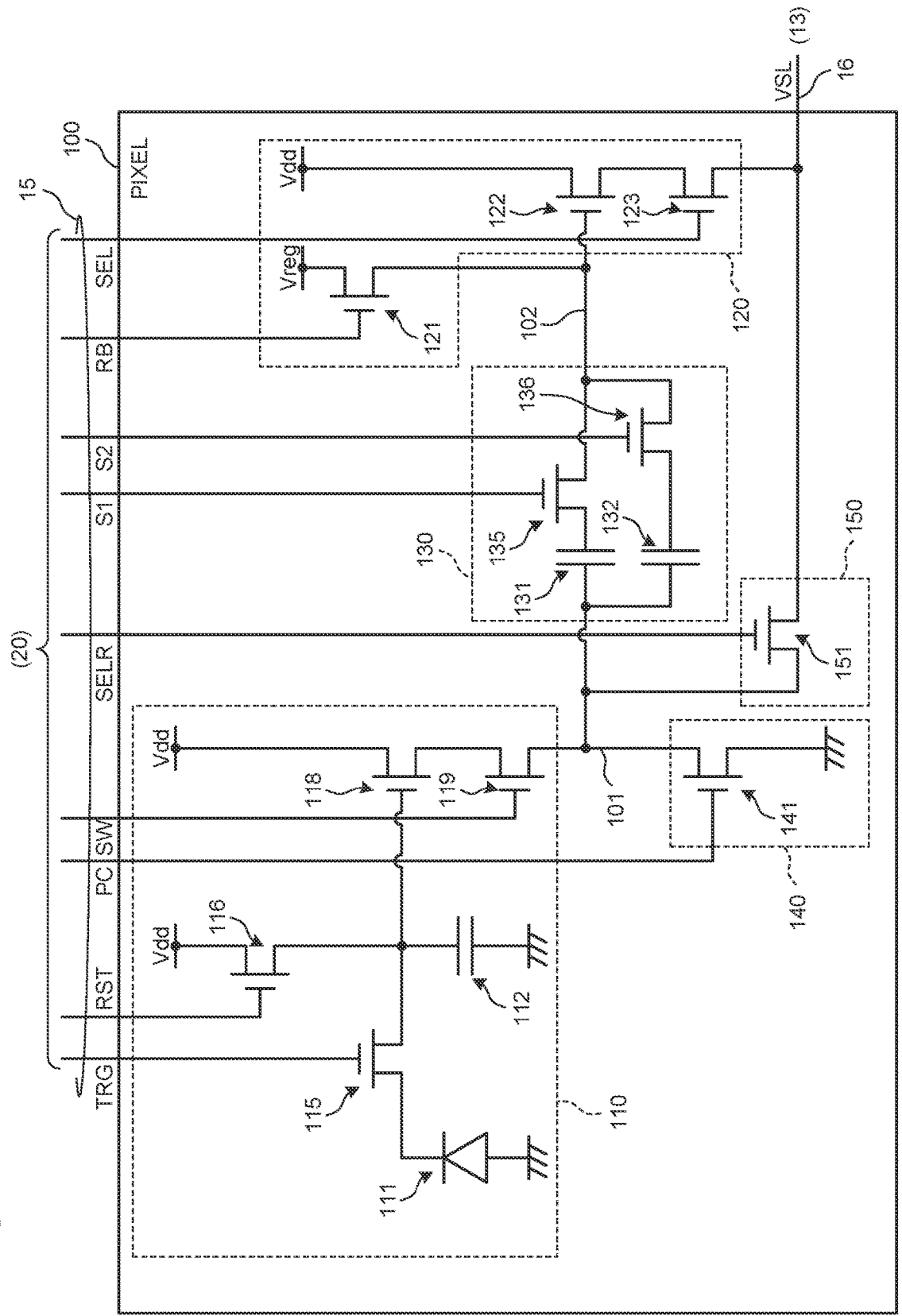
FIG. 4 is a diagram illustrating a configuration example of a pixel according to an embodiment of the present disclosure.

FIG. 4 is a diagram illustrating a configuration example of a pixel according to an embodiment of the present disclosure. The drawing is a circuit diagram illustrating the configuration example of the pixel 100. The pixel 100 in the drawing includes a light receiving unit 110, a signal level storage unit 130, a first image signal generation unit 120, a constant current circuit 140, and a second image signal generation unit 150.

Furthermore, a signal line TRG, a signal line RST, a signal line PC, a signal line SW, a signal line SELR, a signal line S1, a signal line S2, a signal line RB, a signal line SEL, and a signal line VSL are wired to the pixel 100. The signal line TRG, the signal line RST, the signal line PC, the signal line SW, the signal line SELR, the signal line S1, the signal line S2, the signal line RB, and the signal line SEL constitute the signal line 15. The signal line VSL constitutes the signal line 16.

The light receiving unit 110 exposes incident light and outputs a voltage level corresponding to the exposure amount. The light receiving unit 110 in the drawing includes a photoelectric conversion unit 111, a charge storage unit 112, a charge transfer unit 115, a first reset unit 116, a first amplification unit 118, and a first selection unit 119. It is noted that an n-channel MOS transistor can be used for the charge storage unit 112, the charge transfer unit 115, the first reset unit 116, the first amplification unit 118, and the first selection unit 119.

The anode of the photoelectric conversion unit 111 is grounded, and the cathode thereof is connected to the source of the charge transfer unit 115. The drain of the charge transfer unit 115 is connected to the source of the first reset unit 116, the gate of the first amplification unit 118, and one end of the charge storage unit 112. The other end of the charge storage unit 112 is grounded. The drain of the first reset unit 116 is connected to a power supply line Vdd. The drain of the first amplification unit 118 is connected to the power supply line Vdd, and the source thereof is connected to the drain of the first selection unit 119. The source of the first selection unit 119 is connected to a first output node 101. The signal line TRG, the signal line RST, and the signal line SW are connected to the gate of the charge transfer unit 115, the gate of the first reset unit 116, and the gate of the first selection unit 119, respectively.

The photoelectric conversion unit 111 performs photoelectric conversion of incident light. The photoelectric conversion unit 111 can include a photodiode formed on a semiconductor substrate.

The charge transfer unit 115 transfers the charge of the photoelectric conversion unit 111 to the charge storage unit 112. The charge transfer unit 115 transfers the charge by electrically connecting the photoelectric conversion unit 111 to the charge storage unit 112.

The charge storage unit 112 stores the charge generated by the photoelectric conversion of the photoelectric conversion unit 111. The above-described floating diffusion layer can be used for the charge storage unit 112.

The first reset unit 116 resets the charge storage unit 112. The first reset unit 116 performs reset by discharging the charge of the charge storage unit 112 to the power supply line Vad.

The first amplification unit 118 generates a signal corresponding to the charge stored in the charge storage unit 112. The first amplification unit 118 constitutes a source follower circuit together with the constant current circuit 140 connected via the first output node 101, and outputs the generated signal to the first output node 101. It is noted that, in the pixel 100 in the drawing, a voltage level of the signal generated by the first amplification unit 118 is transmitted to the signal level storage unit 130 and the second image signal generation unit 150 via the first output node 101. In addition, the first amplification unit 118 outputs, to the first output node 101, a reset level, which is a voltage level after being reset by the first reset unit 116, and a signal level, which is a voltage level when the charge generated by the photoelectric conversion unit 111 during the exposure period is stored in the charge storage unit 112.

The first selection unit 119 outputs the signal generated by the first amplification unit 118 to the first output node 101. The first selection unit 119 is connected between the first amplification unit 118 and the first output node 101, and transmits the signal of the first amplification unit 118 to the first output node 101 by conducting itself. By arranging the first selection unit 119 to be in the non-conduction state, it is possible to reduce leakage current when the first amplification unit 118 is in the off state.

The constant current circuit 140 is a constant current circuit constituting a load of the first amplification unit 118 described above. The constant current circuit 140 supplies a constant current suction current (sink current) to the first output node 101. The constant current circuit 105 in the drawing includes a MOS transistor 141.

The drain of the MOS transistor 141 is connected to the first output node 101, and the source thereof is grounded. The gate of the gate of the MOS transistor 141 is connected to the signal line PC.

The signal line PC transmits a bias voltage. The bias voltage from the signal line PC is applied to the gate of the MOS transistor 141, and the MOS transistor 141 supplies a constant current corresponding to the applied bias voltage.

The signal level storage unit 130 stores the voltage level output from the light receiving unit. The signal level storage unit 130 is connected to the first output node 101 and stores the level of the signal output from the light receiving unit 110. The signal level storage unit 130 in the drawing includes a first capacitive element 131, a second capacitive element 132, a first switch element 135, and a second switch element 136.

One end of the first capacitive element 131 and one end of the second capacitive element 132 are commonly connected to the first output node 101. The other end of the first capacitive element 131 and the other end of the second capacitive element 132 are connected to the source of the first switch element 135 and the source of the second switch element 136, respectively. The drain of the first switch element 135 and the drain of the second switch element 136 are commonly connected to a second output node 102. The gate of the first switch element 135 and the gate of the second switch element 136 are connected to the signal line S1 and the signal line S2, respectively.

The first capacitive element 131 is a capacitive element that stores the reset level.

The second capacitive element 132 is a capacitive element that stores the signal level.

The first switch element 135 is an element that controls a current flowing through the first capacitive element 131. The first switch element 135 is connected between the first capacitive element 131 and the second output node 102.

The second switch element 136 is an element that controls a current flowing through the second capacitive element 132. The second switch element 136 is connected between the second capacitive element 132 and the second output node 102.

The first image signal generation unit 120 generates the first image signal, which is a signal corresponding to the voltage level stored in the capacitive element unit. The first image signal generation unit 120 in the drawing generates and outputs an image signal corresponding to the signal level stored in the first capacitive element 131 and the second capacitive element 132. The first image signal generation unit 120 in the drawing includes a second reset unit 121, a second amplification unit 122, and a second selection unit 123.

The source of the second reset unit 121 and the gate of the second amplification unit 122 are commonly connected to the second output node 102. The drain of the second reset unit 121 is connected to a power supply line Vreg. The drain of the second amplification unit 122 is connected to the power supply line Vdd, and the source thereof is connected to the drain of the second selection unit 123. The source of the second selection unit 123 is connected to the signal line VSL.

The second reset unit 121 resets the second output node 102. The second reset unit 121 performs reset by applying the voltage of the power supply line Vreg to the second output node 102.

The second amplification unit 122 is an element that generates a signal corresponding to the voltage of the second output node 102. The second amplification unit 122 reads the reset level stored in the first capacitive element 131 and the signal level stored in the second capacitive element 132, and generates the first image signals respectively corresponding to the reset level and the signal level.

The second selection unit 123 is an element that outputs the first image signal generated by the second amplification unit 122 to the signal line VSL. The second selection unit 123 is connected between the second amplification unit 122 and the signal line VSL, and transmits the signal of the second amplification unit 122 to the signal line VSL by conducting itself. It is noted that the circuits of the second amplification unit 122 and the second selection unit 123 constitute a read circuit.

The second image signal generation unit 150 generates the second image signal, which is a signal corresponding to the voltage level output from the light receiving unit 110. The second image signal generation unit 150 in the drawing includes a MOS transistor 151. The drain of the MOS transistor 151 is connected to the first output node 101, and the source thereof is connected to the signal line VSL. The gate of the MOS transistor 151 is connected to the signal line SELR. The MOS transistor 151 itself is conductive so as to output the signal level of the first output node 101 to the signal line VSL. That is, the second image signal generation unit 150 transmits the voltage level of the first output node 101 to the signal line VSL without passing through the signal level storage unit 130. It is noted that the second image signal generation unit 150 outputs the second image signals respectively corresponding to the reset level and the signal level.

The signal level storage unit 130 and the first image signal generation unit 120 can be used at the time of imaging by the global shutter method. Furthermore, the second image signal generation unit 150 can be used at the time of imaging by the local shutter method.

[Generation of Image Signal of Local Shutter Method]

Figure 5:
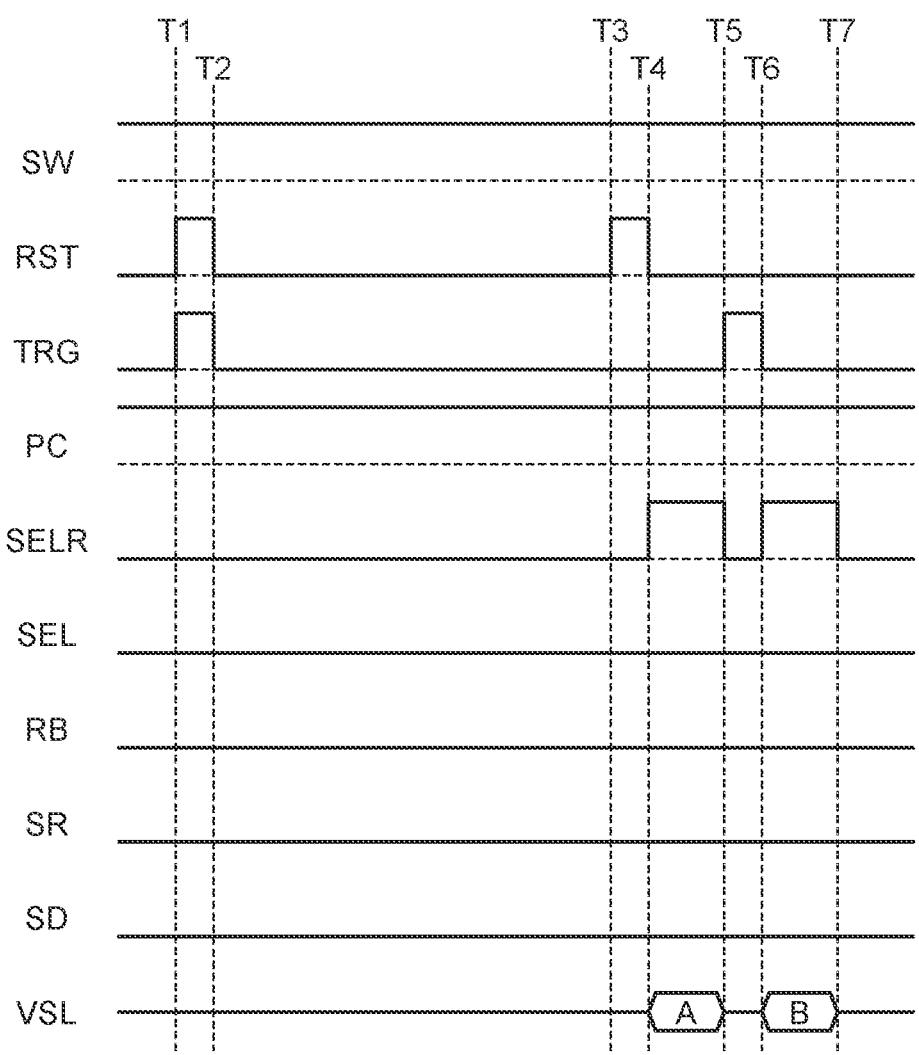
FIG. 5 is a diagram illustrating an example of generation of an image signal according to the embodiment of the present disclosure.

FIG. 5 is a diagram illustrating an example of generation of the image signal according to the embodiment of the present disclosure. The drawing is a timing chart illustrating an example of generation of the second image signal to which the local shutter method is applied. "SW", "RST", "TRG", "SELR", and "SEL" in the drawing respectively represent waveforms of the signal line SW, the signal line RST, the signal line TRG, the signal line SELR, and the signal line SEL. Further, "RB", "S1", and "S2" represent waveforms of the signal line RB, the signal line S1, and the signal line S2, respectively. These waveforms are obtained by binarizing the control signals transmitted by the respective signal lines. A portion of a waveform value of "1" represents an ON signal. Here, the ON signal is a signal that brings an MOS transistor, the gate of which receives the control signal, into a conduction state. In addition, "PC" in the drawing represents a bias voltage applied to the signal line PC. Further, "VSL" in the drawing represents an image signal output to the signal line VSL. It is noted that a broken line in the drawing represents a level of 0 V.

In the initial state, the signal line RST, the signal line TRG, and the signal line SELR have a value of "0". It is noted that the signal line SW has a constant value of "1", and each of the signal line SEL, the signal line RB, the signal line S1, and the signal line S2 has a constant value of "0". In addition, a predetermined bias voltage is always applied to the signal line PC.

At T1, the ON signal is applied to the signal line RST, and the first reset unit 116 is conducted. In addition, the ON signal is applied to the signal line TRG, and the charge transfer unit 115 is conducted. As a result, the photoelectric conversion unit 111 and the charge storage unit 112 are reset.

At T2, the application of the ON signals of the signal line RST and the signal line TRG is stopped, and the first reset unit 116 and the charge transfer unit 115 are brought into the non-conduction state. As a result, charge accumulation in the photoelectric conversion unit 111 is started. It is noted that the period from T1 to T2 corresponds to a reset period.

At T3, the ON signal is applied to the signal line RST, the first reset unit 116 is conducted, and the charge storage unit 112 is reset.

At T4, the application of the ON signal of the signal line RST is stopped, and the first reset unit 116 enters the non-conduction state. At this time, the reset level is output to the first output node 101. In addition, the ON signal is applied to the signal line SELR, and the MOS transistor 151 enters the conduction state. As a result, the second image signal at the reset level is output to the signal line VSL. "A" in the drawing represents the second image signal at the reset level.

At T5, the application of the ON signal of the signal line SELR is stopped, and the MOS transistor 151 enters the non-conduction state. In addition, the ON signal is applied to the signal line TRG, and the charge transfer unit 115 is conducted. As a result, the charge accumulated in the photoelectric conversion unit 111 is transferred to the charge storage unit 112. It is noted that the period from T2 to T5 corresponds to an exposure period.

At T6, the application of the ON signal of the signal line TRG is stopped, and the charge transfer unit 115 enters the non-conduction state. At this time, the signal level is output to the first output node 101. In addition, the ON signal is applied to the signal line SELR to bring the MOS transistor 151 into the conduction state, and the second image signal at the signal level is output to the signal line VSL. "B" in the drawing represents the second image signal at the signal level.

At T7, the application of the ON signal of the signal line SELR is stopped. It is noted that the period from T4 to T7 corresponds to a read period during which the image signal is output from the pixel 100. In the generation of the image signal in the drawing, a part of the exposure period overlaps with the read period. It is noted that CDS for subtracting the second image signal at the reset level output in the period from T4 to T5 from the second image signal at the signal level output in the period from T6 to T7 is performed by the column signal processing unit 13. As a result, the influence of an offset error of the second image signal can be reduced.

[Formation of Frame in Local Shutter Method]

Figure 6:
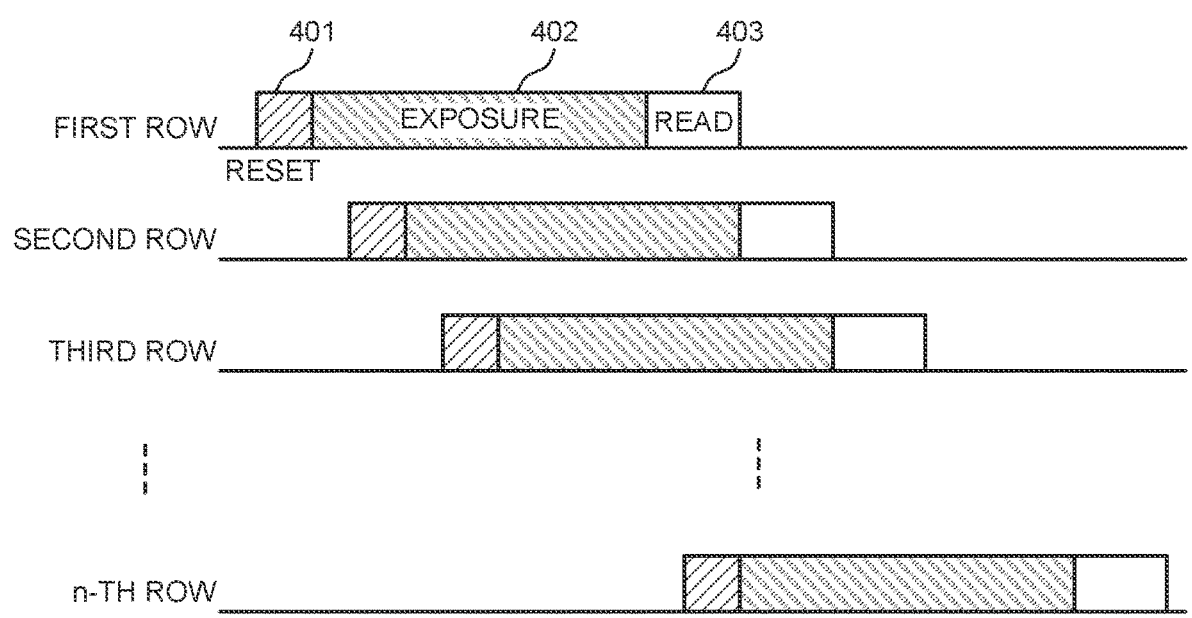
FIG. 6 is a diagram illustrating an example of generation of a frame according to the embodiment of the present disclosure.

FIG. 6 is a diagram illustrating an example of generation of the frame according to the embodiment of the present disclosure. The drawing is a timing chart illustrating an example of generation of the second frame to which the local shutter method is applied. The drawing illustrates a procedure of generating the second image signal for each row in the pixel array unit 11. "Reset", "exposure", and "read" in the drawing represent a reset period 401, an exposure period 402, and a read period 403, respectively. By sequentially performing these processes, the second image signal is read from the pixel 100 for each row. The reset period 401, the exposure period 402, and the read period 403 are performed at a timing shifted for each row. The reason for this is that it is necessary to shift the timing of the read period 403 for each row because the signal line VSL is commonly wired to the pixels 100 arranged in the column of the pixel array unit 11.

The second frame can be formed by generating these second image signals in all the rows of the pixel array unit 11 to generate the second image signals. It is noted that, in imaging of the local shutter method illustrated in the drawing, image distortion occurs in imaging of a moving subject. This is because an exposure timing differs for each row. Meanwhile, as illustrated in FIG. 4, since imaging of the local shutter method can generate the image signal by simple control, it is possible to generate a high-speed frame. Therefore, a frame frequency can be improved. Power consumption can also be reduced.

[Generation of Image Signal of Global Shutter Method]

Figure 7:
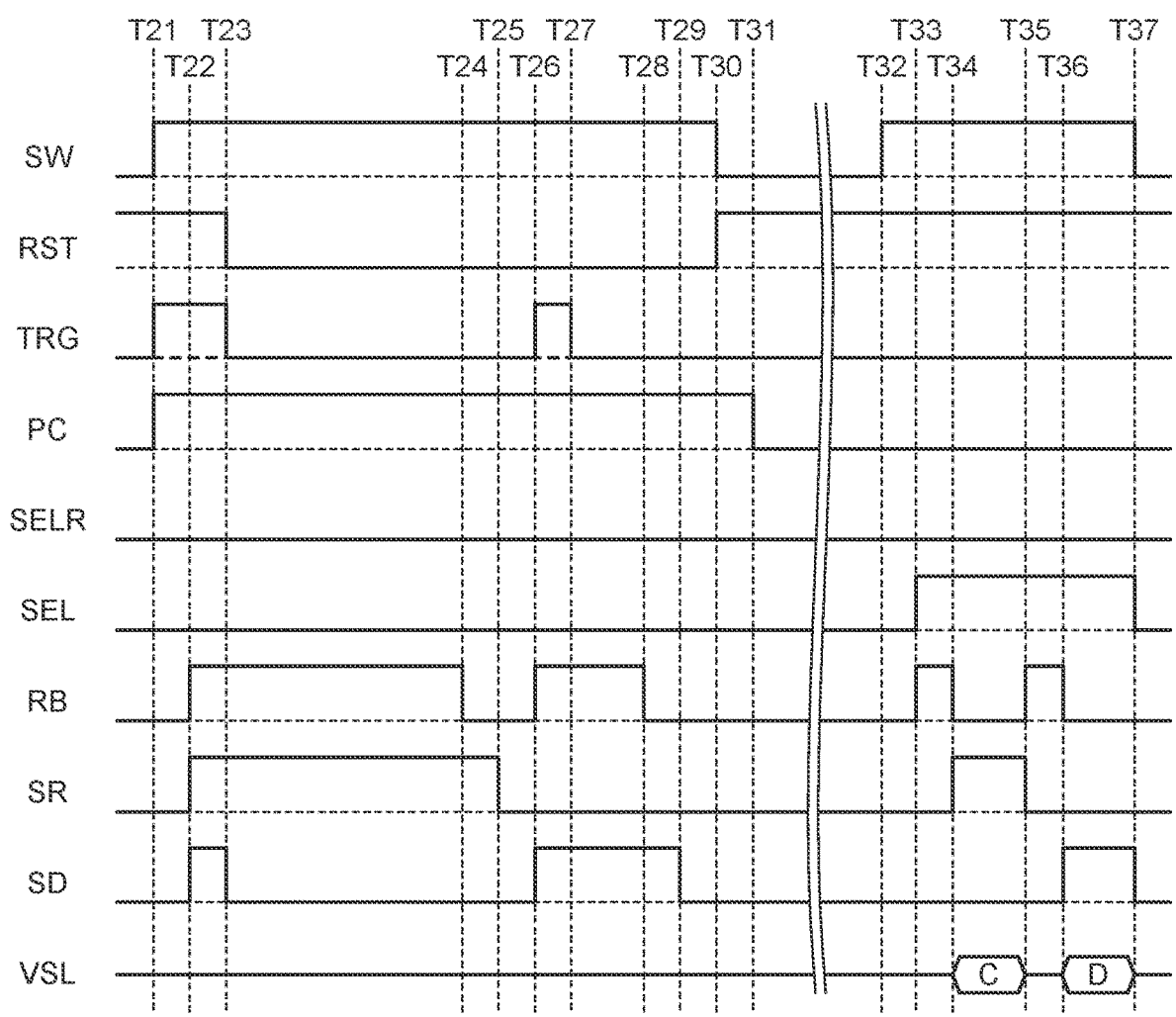
FIG. 7 is a diagram illustrating the example of the generation of the image signal according to the embodiment of the present disclosure.

FIG. 7 is a diagram illustrating an example of generation of the image signal according to the embodiment of the present disclosure. The drawing is a timing chart illustrating an example of generation of the second image signal to which the global shutter method is applied. The same notation as in FIG. 5 is used in the drawing.

In the initial state, each of the signal line SW, the signal line TRG, the signal line PC, the signal line SEL, the signal line RB, the signal line S1, and the signal line S2 has a value of "0". In addition, the signal line RST has a value of "1". It is noted that the signal line SELR has a constant value of "0".

At T21, the ON signal is applied to the signal line SW, and the first selection unit 119 enters the conduction state. In addition, the ON signal is applied to the signal line TRG, and the charge transfer unit 115 enters the conduction state. In addition, a predetermined bias voltage is applied to the signal line PC, and the MOS transistor 109 supplies a constant current to the first output node 101. Since the first reset unit 116 and the charge transfer unit 115 are brought into the conduction state, the photoelectric conversion unit 111 and the charge storage unit 112 are reset.

At T22, the ON signal is applied to the signal line RB, and the second reset unit 121 enters the conduction state. In addition, the ON signal is applied to the signal line S1, and the first switch element 135 enters the conduction state. In addition, the ON signal is applied to the signal line S2, and the second switch element 136 is brought into the conduction state. During the period from T1 to T2, the charge storage unit 112 is reset, and the first capacitive element 131 and the second capacitive element 132 are also reset. In addition, the second output node 102 becomes VREG that is the voltage of the power supply line Vreg.

At T23, the application of the ON signal of the signal line RST is stopped, and the first reset unit 116 enters the non-conduction state. Furthermore, the application of the ON signal to the signal line TRG is stopped, and the charge transfer unit 115 enters the non-conduction state. In addition, the application of the ON signal of the signal line S2 is stopped, and the second switch element 136 enters the non-conduction state. As a result, reset of the photoelectric conversion unit 111 and the charge storage unit 112 ends. This reset corresponds to global reset that is simultaneously executed in all the pixels 100. With the end of the reset, the exposure period is started, and the charge generated by the photoelectric conversion is accumulated in the photoelectric conversion unit 111. The reset level is output to the first output node 101. Therefore, the first capacitive element 131 is charged to the reset level.

At T24, the application of the ON signal to the signal line RB is stopped, and the second reset unit 121 enters the non-conduction state. As a result, the reset level is stored in the first capacitive element 131.

At T25, the application of the ON signal to the signal line S1 is stopped, and the first switch element 135 enters the non-conduction state.

At T26, the ON signal is applied to the signal line TRG, and the charge transfer unit 115 enters the conduction state. As a result, the charge of the photoelectric conversion unit 111 is transferred to the charge storage unit 112. In addition, the ON signal is applied to the signal line RB, and the second reset unit 121 enters the conduction state. As a result, the second output node 102 becomes VREG. In addition, the ON signal is applied to the signal line S2, and the second switch element 136 is brought into the conduction state.

At T27, the application of the ON signal to the signal line TRG is stopped, and the charge transfer unit 115 enters the non-conduction state. The signal level is output to the first output node 101. Therefore, the second capacitive element 132 is charged to the signal level.

At T28, the application of the ON signal to the signal line RB is stopped, and the second reset unit 121 enters the non-conduction state. As a result, the image signal level is stored in the second capacitive element 132.

At T29, the application of the ON signal to the signal line S2 is stopped, and the second switch element 136 enters the non-conduction state.

At T30, the application of the ON signal to the signal line SW is stopped, and the first selection unit 119 enters the non-conduction state. In addition, the ON signal is applied to the signal line RST, and the first reset unit 116 enters the conduction state.

At T31, the application of the bias voltage to the signal line PC is stopped. This brings the MOS transistor 109 into the non-conduction state.

At T32, the ON signal is applied to the signal line SW, and the first selection unit 119 enters the conduction state.

At T33, the ON signal is applied to the signal line SEL, and the second selection unit 123 enters the conduction state. In addition, the ON signal is applied to the signal line RB, and the second reset unit 121 enters the conduction state. As a result, the second output node 102 is reset to the voltage of VREG.

At T34, the application of the ON signal to the signal line RB is stopped, and the second reset unit 121 enters the non-conduction state. In addition, the ON signal is applied to the signal line S1, and the first switch element 135 enters the conduction state. Since the first reset unit 116 is in the conduction state, the second output node 102 becomes a voltage in which the reset level is superimposed on VREG. The image signal corresponding to this voltage is generated by the second amplification unit 122 and is output to the signal line VSL. This image signal corresponds to the first image signal at the reset level. "C" in the drawing represents the first image signal at the reset level.

At T35, the application of the ON signal to the signal line S1 is stopped, and the first switch element 135 enters the non-conduction state. In addition, the ON signal is applied to the signal line RB, and the second reset unit 121 enters the conduction state. As a result, the second output node 102 is reset to the voltage of VREG.

At T36, the application of the ON signal to the signal line RB is stopped, and the second reset unit 121 enters the non-conduction state. In addition, the ON signal is applied to the signal line S2, and the second switch element 136 is brought into the conduction state. The second output node 102 becomes a voltage in which the signal level is superimposed on VREG. The image signal corresponding to this voltage is generated by the second amplification unit 122 and is output to the signal line VSL as the image signal. This image signal corresponds to the first image signal at the signal level. "D" in the drawing represents the first image signal at the signal level.

At T37, the application of the ON signal to the signal line SW is stopped, and the first selection unit 119 enters the non-conduction state. Furthermore, the application of the ON signal to the signal line SEL is stopped, and the second selection unit 123 enters the non-conduction state. In addition, the application of the ON signal to the signal line S2 is stopped, and the second switch element 136 enters the non-conduction state.

The procedures from T21 to T31 are sequentially executed for all the rows of the pixel array unit 11. As a result, the image signal for one screen can be generated. Further, the period from T32 to T37 corresponds to a read period. It is noted that CDS for subtracting the first image signal at the reset level output in the period from T34 to T35 from the first image signal at the signal level output in the period from T36 to T37 is performed by the column signal processing unit 13. As a result, the VREG component is removed. In addition, the influence of an offset error of the first image signal can be reduced. The offset error corresponds to, for example, an error due to a charge generated by incident light leaking from the vicinity of the photoelectric conversion unit 111. By the above-described subtraction processing, an error due to an offset commonly generated in the first capacitive element 131 and the second capacitive element 132 is reduced, thereby making it possible to reduce parasitic light sensitivity (PLS), which is sensitivity based on leaked incident light.

[Formation of Frame in Global Shutter Method]

Figure 8:
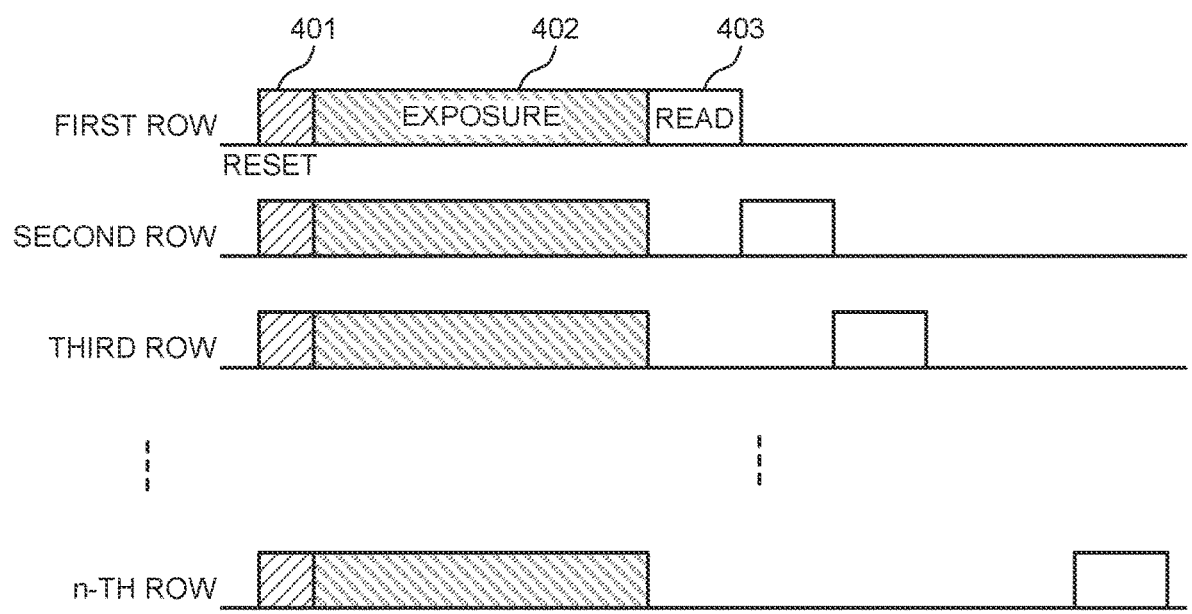
FIG. 8 is a diagram illustrating the example of the generation of the frame according to the embodiment of the present disclosure.

FIG. 8 is a diagram illustrating an example of generation of the frame according to the embodiment of the present disclosure. The drawing is a timing chart illustrating an example of generation of the first frame to which the global shutter method is applied. Similarly to FIG. 6, this drawing illustrates a generation procedure of the second image signal for each row in the pixel array unit 11. In the drawing, the same notation as in FIG. 6 is used.

As illustrated in the drawing, in the global shutter method, reset and exposure are simultaneously performed in all the pixels 100 of the pixel array unit 11. Thereafter, the first frame can be formed by sequentially performing reading for each row to generate the first image signal.

As described above, in the imaging of the global shutter method in which the exposure is simultaneously performed in all the pixels 100, it is possible to prevent occurrence of distortion as in the imaging of the local shutter method. Meanwhile, in the global shutter method, an imaging procedure becomes complicated as compared with the local shutter method, and thus, it takes time to generate a frame. Therefore, the frame frequency decreases.

[Surrounding Map Generation]

Figure 9:
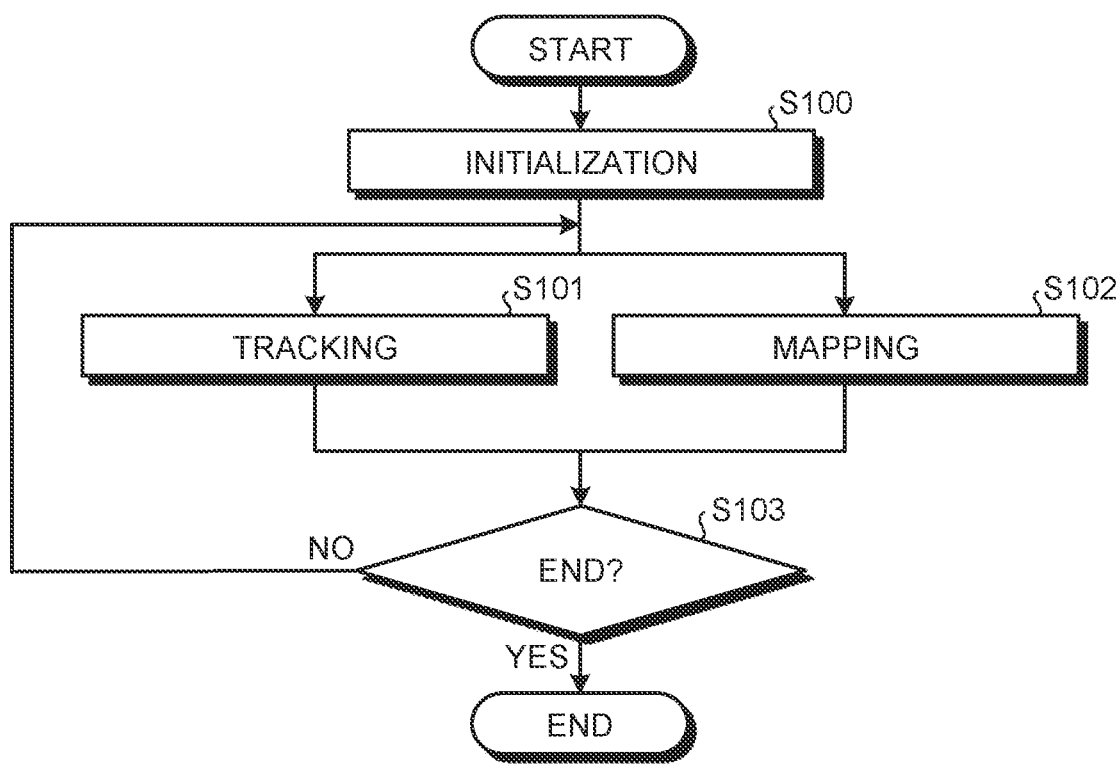
FIG. 9 is a diagram illustrating an example of surrounding map generation according to the embodiment of the present disclosure.

FIG. 9 is a diagram illustrating an example of surrounding map generation according to the embodiment of the present disclosure. The drawing is a flowchart illustrating an example of generation of the surrounding map in the self-position estimation unit 50.

First, the self-position estimation unit 50 performs initialization processing (step S100). In this initialization, an initial position and an initial map in a coordinate system to be used are acquired. Next, the self-position estimation unit 50 performs tracking processing (step S101). This tracking is processing of estimating a position by comparing a first frame before one frame with a newly generated first frame. In parallel with this tracking processing, the self-position estimation unit 50 performs mapping processing (step S102). This mapping can be performed by mapping a feature point detected from the first frame in the tracking processing on the coordinate system.

Next, the self-position estimation unit 50 determines whether to end the surrounding map generation processing (step S103), and if it is determined not to end the processing (step S103, No), the processing returns to steps S101 and S102 and continues the subsequent operations. On the other hand, when it is determined to end the processing (step S103, Yes), the surrounding map generation processing ends.

[Information Processing Procedure]

Figure 10:
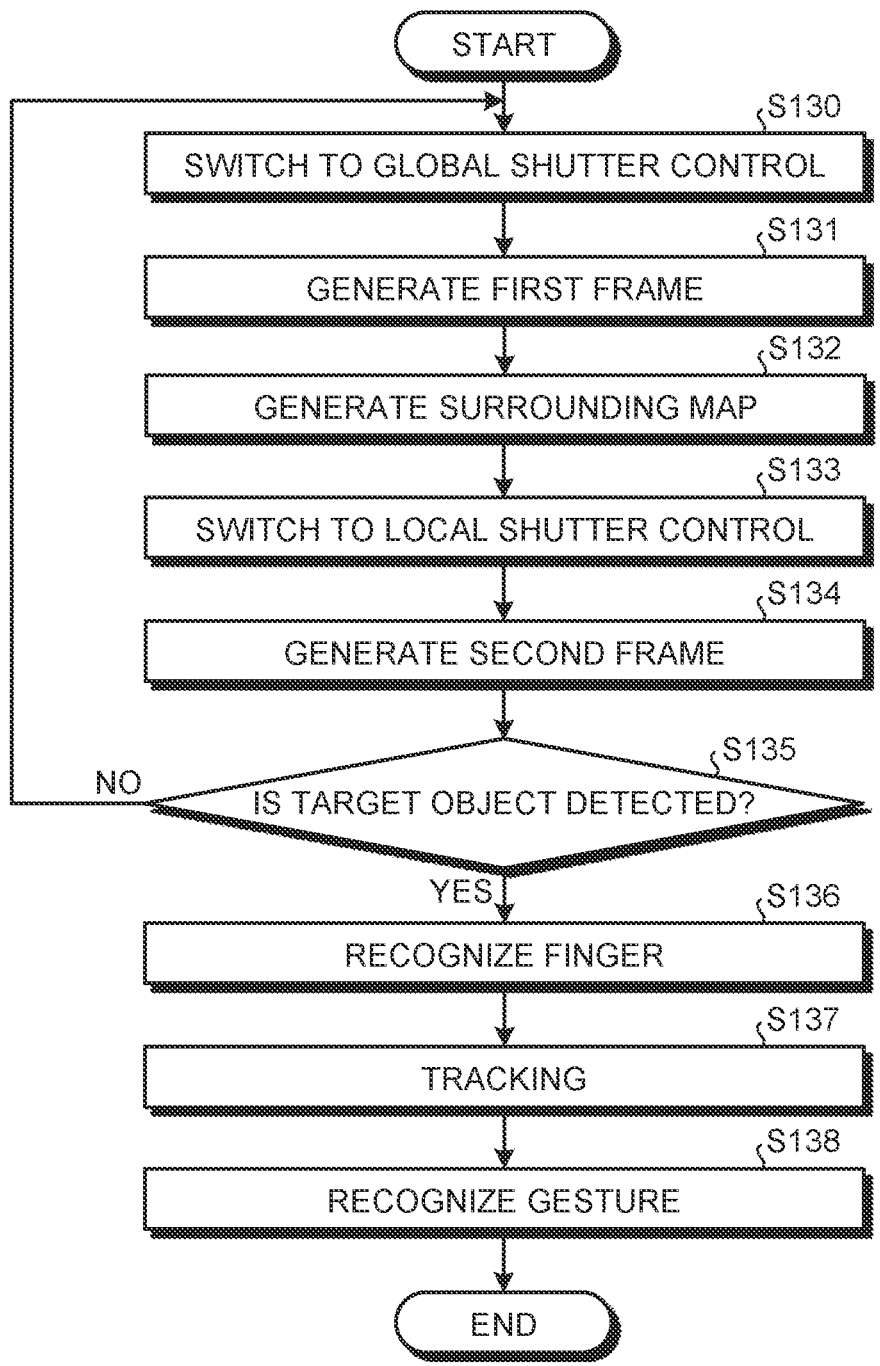
FIG. 10 is a diagram illustrating an example of a processing method according to the first embodiment of the present disclosure.

FIG. 10 is a diagram illustrating an example of a processing method according to the first embodiment of the present disclosure. The drawing is a flowchart illustrating a procedure of processing in the body wearable terminal 1. This drawing illustrates an example of a case in which a finger is detected as a target object and gesture recognition is performed.

First, the pixel 100 of the pixel array unit 11 is switched to global shutter control (step S130). This can be performed by causing the pixel control unit 30 to switch to the control of the global shutter method. Next, a first frame is generated (step S131). This can be performed by allowing the image generation unit 40 to generate the first frame based on the first image signal generated by the pixel 100. Next, the self-position estimation unit 50 generates a surrounding map from the first frame (step S132). Next, the control of the pixel 100 of the pixel array unit 11 is switched to the control of the local shutter (step S133).

Next, a second frame is generated (step S134). This can be performed by allowing the image generation unit to generate the second frame based on the second image signal generated by the pixel 100. Next, it is determined whether the object detection unit 60 detects a target object (step S135). As a result, when the target object is not detected (step S135, No), the processing proceeds to processing in step S130. On the other hand, when the target object is detected (step S135, Yes), the processing proceeds to processing in step S136.

In step S136, the control unit 70 recognizes whether the target object is a finger (step S136). Next, the control unit 70 performs tracking of the recognized finger (step S137). Next, the control unit 70 performs gesture recognition based on the result of tracking (step S138). Thereafter, the control unit 70 can cause the display unit 6 to display the surrounding map and the result of the gesture recognition.

According to the above procedure, the surrounding map can be generated and displayed. In addition, the target object can be further detected, and an image based on target object can be superimposed and displayed on the surrounding map.

It is noted that the order of the processing in steps S130 to S132 and the processing in steps S133 and S134 can be reversed. Furthermore, instead of the processing in steps S136 to S138, processing of displaying the image based on the second frame on the display unit 6 can be performed. Since the user of the body wearable terminal 1 cannot see a landscape of the outside world, it is also possible to perform processing of displaying an image of the outside world captured by the imaging element 3 on the display unit 6 in response to a request of the user.

Figure 11:
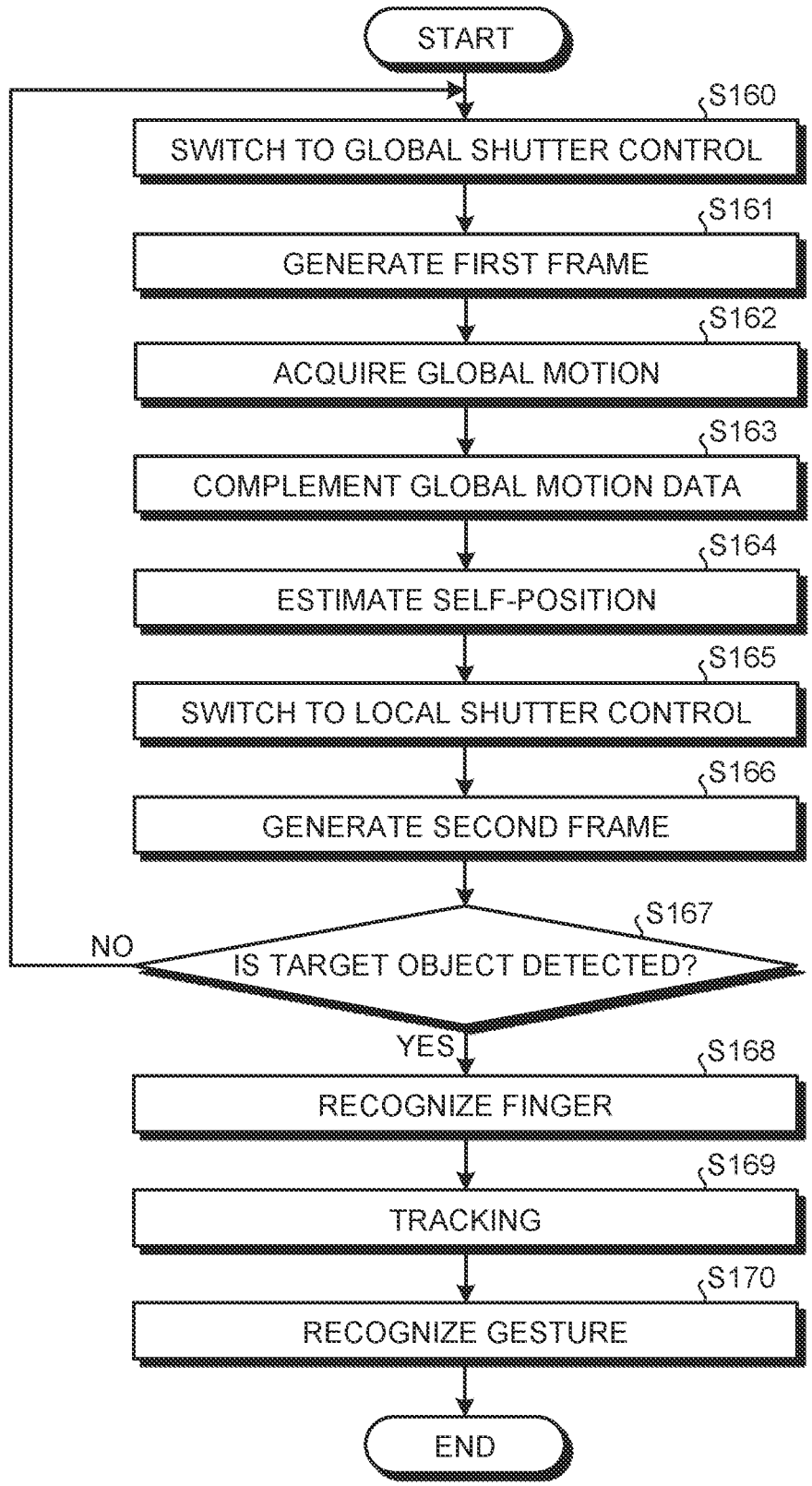
FIG. 11 is a diagram illustrating another example of the processing method according to the embodiment of the present disclosure.

FIG. 11 is a diagram illustrating another example of the processing method according to the embodiment of the present disclosure. This drawing illustrates an example of a case in which a global motion representing the movement of the image of the outside world is complemented based on the movement information output from the inertial measurement unit 2, and the self-position is estimated using the complemented global motion.

First, the pixel 100 of the pixel array unit 11 is switched to the global shutter control (step S160). Next, a first frame is generated (step S161). Next, the global motion is acquired from the first frame (step S162). For example, this processing is performed by the control unit 70. Next, global motion data is complemented (step S163). This can be performed by complementing the global motion including a plurality of first frames based on the movement information generated by the inertial measurement unit 2. Next, the self-position estimation unit 50 estimates the self-position based on the complemented global motion (step S164), and generates a surrounding map.

Next, the control of the pixel 100 of the pixel array unit 11 is switched to the control of the local shutter (step S165). Next, a second frame is generated (step S166). Next, it is determined whether the object detection unit 60 detects a target object (step S167). As a result, when the target object is not detected (step S167, No), the processing proceeds to processing in step S160. On the other hand, when the target object is detected (step S167, Yes), the processing proceeds to processing in step S168.

In step S168, the control unit 70 recognizes whether the target object is a finger (step S168), performs tracking of the recognized finger (step S169), and performs gesture recognition based on the result of tracking (step S138). Thereafter, the control unit 70 can cause the display unit 6 to display the surrounding map and the result of the gesture recognition.

As described above, the body wearable terminal 1 according to the embodiment of the present disclosure can generate an image (frame) based on each imaging method using the imaging element 3 that performs imaging by performing switching between the local shutter method and the global shutter method. The first frame generated by the global shutter method is applied to the image for the surrounding map generation processing. In the first frame, since an image having no deviation in the time axis of each part of the frame can be obtained, the self-position can be estimated and the surrounding map can be generated with high accuracy. In addition, by applying the second frame generated by the local shutter method to the image for target object detection processing, the target object detection processing can be performed at high speed and power consumption can be reduced. As described above, the body wearable terminal 1 can generate an image by performing switching between the local shutter method and the global shutter method according to the application. It is noted that the complement of the global motion including the plurality of first frames based on the movement information in step S164 is an example of correction of the surrounding map based on the movement information described in the claims.

2. Second Embodiment

The body wearable terminal 1 of the first embodiment described above includes one imaging element 3. On the other hand, a body wearable terminal 1 according to a second embodiment of the present disclosure is different from that of the above-described first embodiment in that a plurality of imaging elements 3 are provided.

[Body Wearable Terminal]

Figure 12:
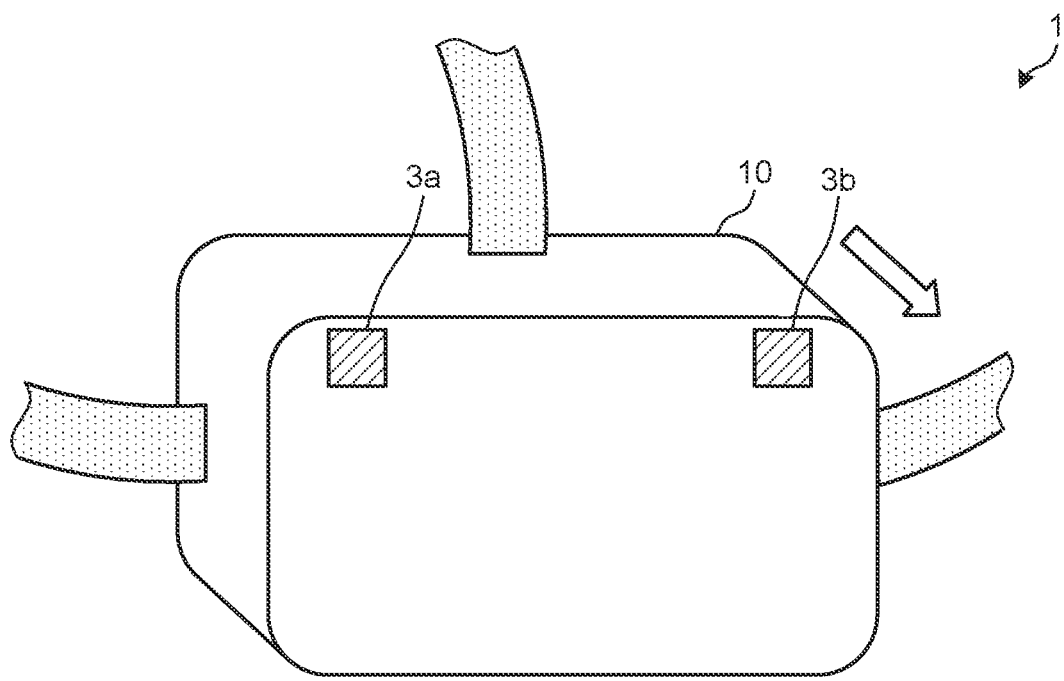
FIG. 12 is a diagram illustrating an example of a body wearable terminal according to a second embodiment of the present disclosure.

FIG. 12 is a diagram illustrating an example of the body wearable terminal according to the second embodiment of the present disclosure. The drawing is a diagram illustrating an appearance of the body wearable terminal 1, similarly to FIG. 1. This body wearable terminal is different from the body wearable terminal 1 in FIG. 1 in that an imaging element 3a and an imaging element 3b are arranged.

In the body wearable terminal 1 in the drawing, the imaging element 3a and the imaging element 3b are arranged on the left and right of the housing 10. As a result, an image (a frame) corresponding to stereo can be generated.

[Configuration of Body Wearable Terminal]

Figure 13:
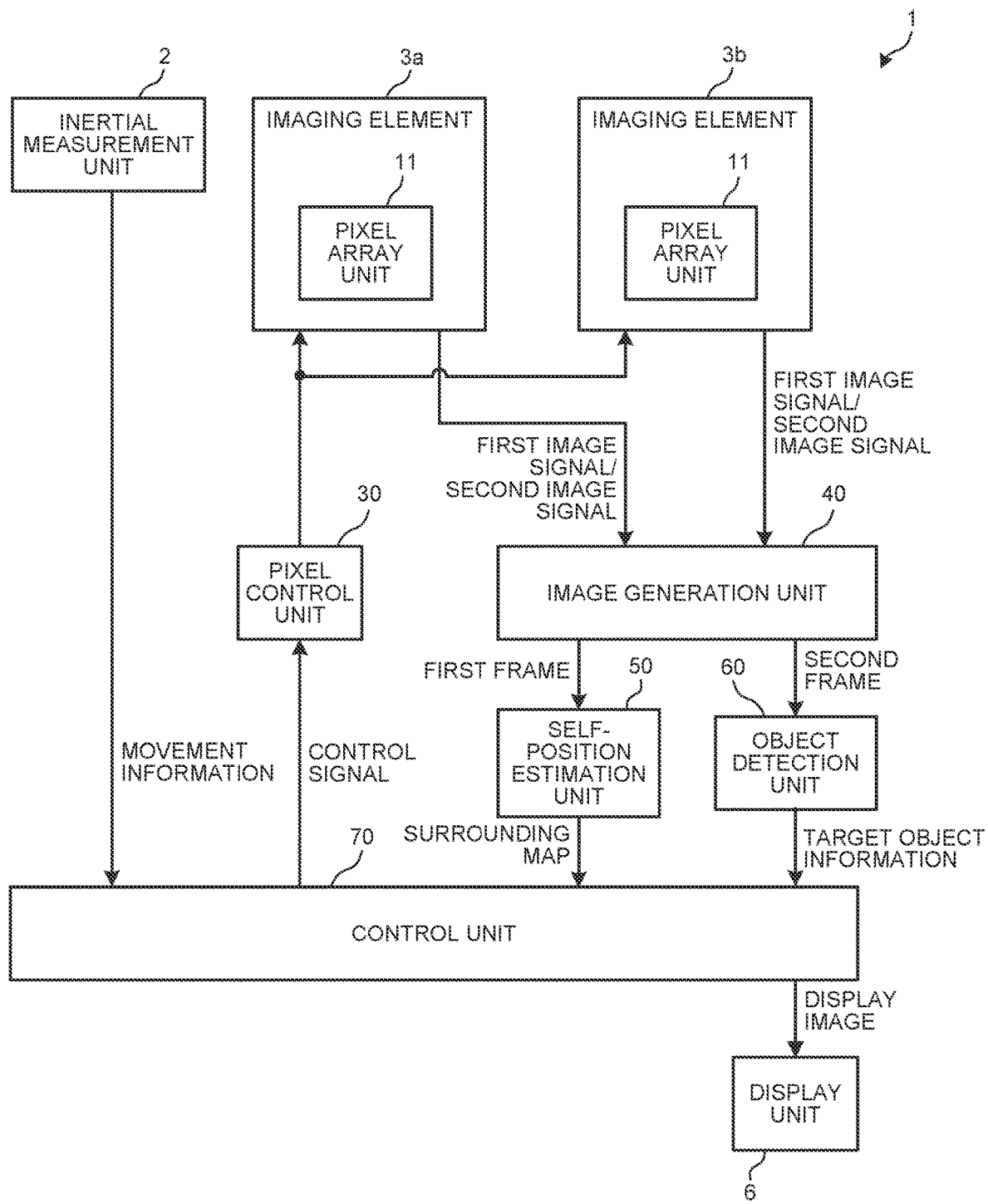
FIG. 13 is a diagram illustrating a configuration example of the body wearable terminal according to the second embodiment of the present disclosure.

FIG. 13 is a diagram illustrating a configuration example of the body wearable terminal according to the second embodiment of the present disclosure. The drawing is a diagram illustrating a configuration example of the body wearable terminal 1, similarly to FIG. 2. The body wearable terminal 1 in this drawing is different from the body wearable terminal 1 in FIG. 2 in that the imaging element 3a and the imaging element 3b are provided. It is noted that the illustration of the imaging element 3a and the imaging element 3b is simplified in the drawing.

The pixel control unit 30 in the drawing controls the imaging element 3a and the imaging element 3b. Furthermore, the image generation unit 40 in the drawing generates a first frame and a second frame for each of the imaging element 3a and the imaging element 3b. Furthermore, the self-position estimation unit 50 generates a surrounding map from the first frame for each of the imaging element 3a and the imaging element 3b. Furthermore, the object detection unit 60 can detect a target object from the second frame for each of the imaging element 3a and the imaging element 3b.

Other configurations of the body wearable terminal 1 are similar to those of the body wearable terminal 1 in the first embodiment of the present disclosure, and thus, a description thereof will be omitted.

As described above, the body wearable terminal 1 according to the second embodiment of the present disclosure generates the first frame and the second frame based on the image signals generated by the imaging element 3*a* and the imaging element 3*b*. With the image corresponding to stereo, depth information can be acquired and, as such, a more accurate surrounding map can be generated and a target object can be detected.

3. Modification

The imaging element 3 of the above-described embodiment can also adopt other configurations. Another configuration example of the imaging element 3 will be described.

[Configuration of Pixel]

Figure 14:
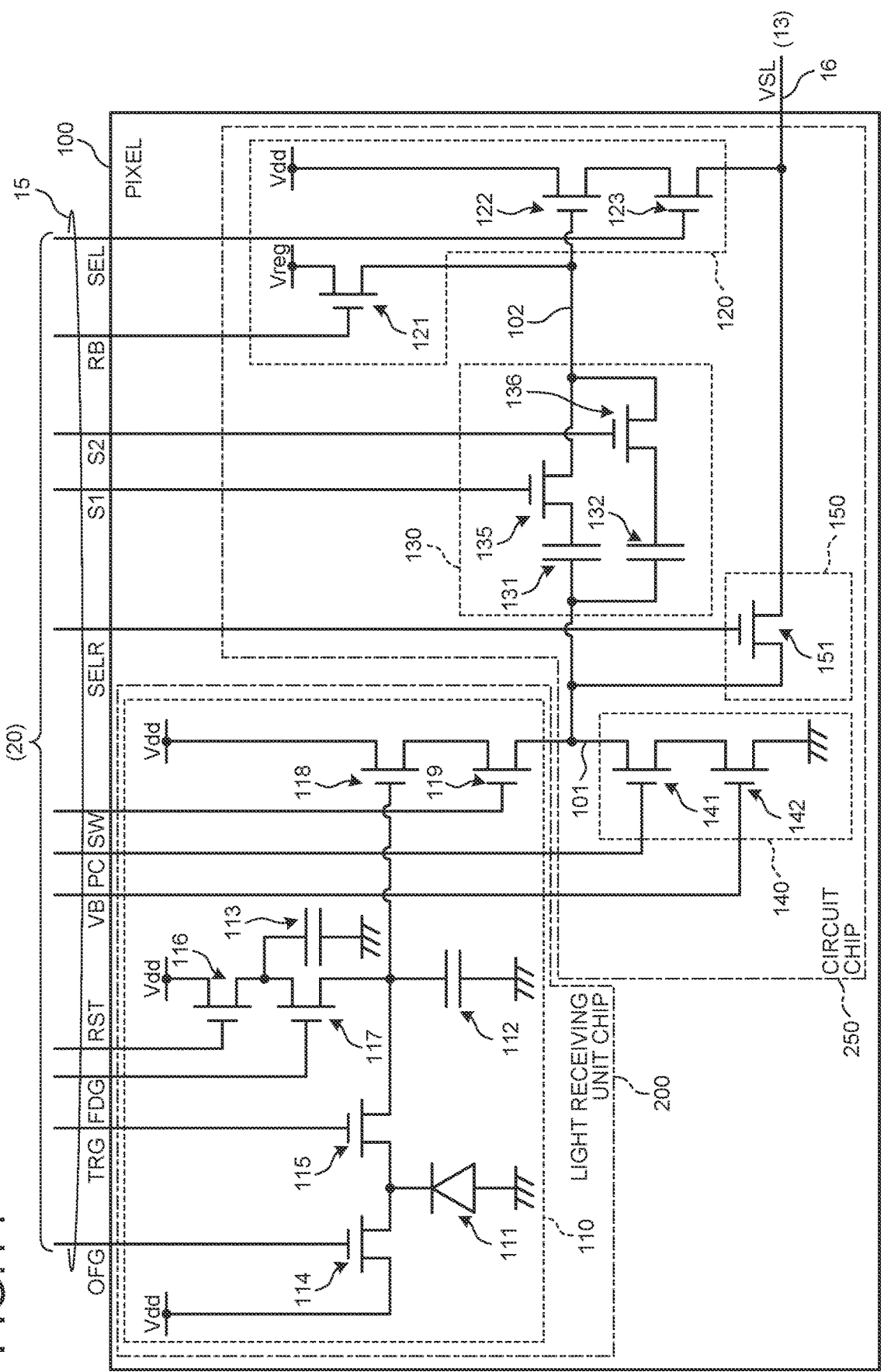
FIG. 14 is a diagram illustrating a configuration example of a pixel according to a modification of the embodiment of the present disclosure.

FIG. 14 is a diagram illustrating a configuration example of a pixel according to a modification of the embodiment of the present disclosure. The drawing is a circuit diagram illustrating a configuration example of the pixel 100, similarly to FIG. 3.

The light receiving unit 110 in the drawing further includes a charge discharging unit 114, a coupling unit 117, and a second charge storage unit 113. An n-channel MOS transistor can be applied to the charge discharging unit 114 and the coupling unit 117. The drain of the charge discharging unit 114 is connected to the power supply line Vdd, and the source thereof is connected to the cathode of the photoelectric conversion unit 111. The gate of the charge discharging unit 114 is connected to the signal OFG. The drain of the coupling unit 117 is connected to the source of the first reset unit 116, and the source thereof is connected to the drain of the charge transfer unit 115, the gate of the first amplification unit 118, and one end of the charge storage unit 112. The gate of the coupling unit 117 is connected to the signal line FDG. The second charge storage unit 113 is connected between the drain of the coupling unit 117 and the ground line.

The charge discharging unit 114 is a MOS transistor that resets the photoelectric conversion unit 111. The charge discharging unit 114 resets the photoelectric conversion unit 111 by discharging the charge of the photoelectric conversion unit 111 to the power supply line Vdd. By disposing the charge discharging unit 114, the photoelectric conversion unit 111 can be reset in a period during which the charge is stored in the charge storage unit 112, and the start of exposure in the next imaging can be advanced.

The second charge storage unit 113 stores a charge generated by photoelectric conversion in the photoelectric conversion unit 111. The second charge storage unit 113 stores a charge when coupled to the charge storage unit 112.

The coupling unit 117 couples the charge storage unit 112 to the second charge storage unit 113. The coupling unit 117 couples the second charge storage unit 113 to the charge storage unit 112 by connecting the second charge storage unit 113 to the charge storage unit 112 in parallel. By this coupling, it is possible to increase the retention capacity of the charge generated by the photoelectric conversion unit 111, and it is possible to adjust sensitivity.

The constant current circuit 140 in the drawing further includes a MOS transistor 142. The drain of the MOS transistor 142 is connected to the source of the MOS transistor 141, and the source thereof is grounded. The gate of the MOS transistor 142 is connected to the signal line VB.

Similarly to the signal line PC, a bias voltage is applied to the signal line VB. The MOS transistor 142 supplies a constant current corresponding to the bias voltage. By connecting the MOS transistors 141 and 142 in series and supplying the bias voltage to each gate, noise of the constant current circuit 140 can be reduced. In addition, it is possible to reduce fluctuation in output current when a power supply voltage fluctuates.

Furthermore, the pixel 100 in the drawing can be divided and arranged in a plurality of different semiconductor chips. This drawing illustrates an example of division into a light receiving unit chip 200 and a circuit chip 250. The light receiving unit 110 is arranged on the light receiving unit chip 200. In the circuit chip 250, the constant current circuit 140, the signal level storage unit 130, the first image signal generation unit 120, and the second image signal generation unit 150 are arranged. The light receiving unit chip 200 and the circuit chip 250 can be stacked. In this case, the area of the pixel 100 can be reduced.

Furthermore, a configuration in which the first image signal generation unit 120 and the second image signal generation unit 150 are shared by the plurality of pixels 100 can be adopted.

[Another Configuration of Pixel]

Figure 15:
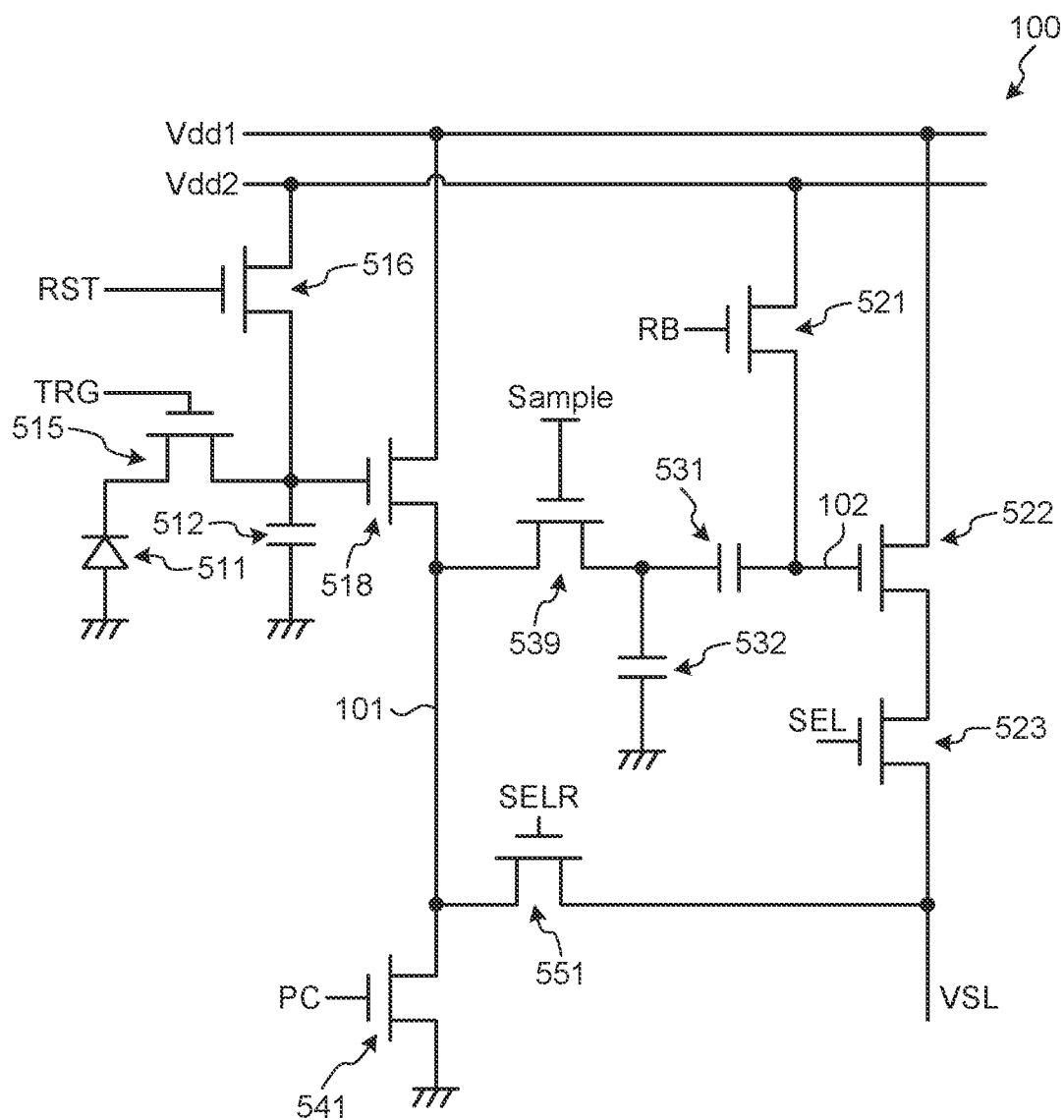
FIG. 15 is a diagram illustrating another configuration example of the pixel according to the modification of the embodiment of the present disclosure.

FIG. 15 is a diagram illustrating another configuration example of the pixel according to the modification of the embodiment of the present disclosure. The drawing is a circuit diagram illustrating a configuration example of the pixel 100, similarly to FIG. 14.

The pixel 100 in the drawing includes a photoelectric conversion unit 511, a charge storage unit 512, a charge transfer unit 515, a first reset unit 516, a first amplification unit 518, a MOS transistor 541, a second amplification unit 522, and a selection unit 523. Furthermore, the pixel 100 in the drawing further includes a sampling unit 539, a first capacitive element 531, a second capacitive element 532, and a MOS transistor 551.

The photoelectric conversion unit 511, the charge storage unit 512, the charge transfer unit 515, and the first reset unit 516 are similar to the photoelectric conversion unit 111, the charge storage unit 112, the charge transfer unit 115, the first reset unit 116, and the coupling unit 117 in FIG. 3, and thus a description thereof is omitted. In addition, the first amplification unit 518, the MOS transistor 541, the second reset unit 521, and the second amplification unit 522 are similar to the first amplification unit 118, the MOS transistor 141, the second reset unit 121, and the second amplification unit 122 in FIG. 3, and thus a description thereof will be omitted. Since the selection unit 523 is similar to the second selection unit 123 in FIG. 3, a description thereof will be omitted.

The sampling unit 539 opens and closes between the first capacitive element 531 and the second capacitive element 532, and the source of the first amplification unit 518. An n-channel MOS transistor can be applied to the sampling unit 539. The first capacitive element 531 is connected between the sampling unit 539 and the second amplification unit 522. The second capacitive element 532 is connected between the source of the sampling unit 539 and the ground line. Furthermore, the MOS transistor 551 is connected between the source of the first amplification unit 518 and the output signal line VSL. In the circuit of the drawing, a node connected to the source of the first amplification unit 518 corresponds to the first output node 101, and a node between the second capacitive element 532 and the gate of the second amplification unit 522 corresponds to the second output node 102.

In the pixel 100 in the drawing, circuits of the sampling unit 539, the first capacitive element 531, and the second capacitive element 532 constitute the signal level storage unit 130. When the first amplification unit 518 outputs the reset level to the first output node 101, the second reset unit 521 and the sampling unit 539 are conducted. As a result, the reset level is stored in the first capacitive element 531. Next, when the first amplification unit 518 outputs the signal level to the first output node 101, the sampling unit 539 is made conductive while the second reset unit 521 is brought into the non-conduction state. As a result, the signal level is stored in the second capacitive element 532. Thereafter, the sampling unit 539 is brought into the non-conduction state. As a result, a voltage in which the respective voltages of the second capacitive element 532 and the first capacitive element 531 are superimposed is applied to the second output node 102. This voltage corresponds to a voltage obtained by subtracting the reset level from the signal level. The second amplification unit 522 and the selection unit 523 constituting the first image signal generation unit 120 generate the first image signal according to the voltage of the second output node 102.

The MOS transistor 551 in the drawing constitutes the second image signal generation unit 150. The MOS transistor 551 outputs the voltage level of the first output node 101 to the signal line VSL as a second image signal.

In the pixel 100 in the drawing as well, the signal level storage unit 130 and the first image signal generation unit 120 can be used at the time of imaging of the global shutter method. Furthermore, the second image signal generation unit 150 can be used at the time of imaging by the local shutter method.

[Effects]

The body wearable terminal 1 according to the present disclosure includes the pixel array unit 11, the pixel control unit 30, the image generation unit 40, the self-position estimation unit 50, the object detection unit 60, the display unit 6, and the control unit 70. In the pixel array unit 11, the pixels 100 are arranged in a two-dimensional matrix, in which each of the pixels 100 includes the light receiving unit 110 that exposes incident light and outputs a voltage level corresponding to an exposure amount, the signal level storage unit 130 that stores the voltage level output from the light receiving unit 110, the first image signal generation unit 120 that generates a first image signal, which is a signal corresponding to the voltage level stored in the signal level storage unit 130, and the second image signal generation unit 150 that generates a second image signal, which is a signal corresponding to the voltage level output from the light receiving unit 110. The pixel control unit performs a local shutter that sequentially performs, on the pixels 100, exposure of the incident light in the light receiving unit 110 and generation of the second image signal in the second image signal generation unit 150 based on the voltage level output after the exposure at a timing shifted for each row of the pixel array unit 11, and a global shutter that simultaneously performs, on the pixels 100 arranged in the pixel array unit 11, the exposure of the incident light in the light receiving unit 110 and storage of the voltage level output after the exposure in the signal level storage unit 130 and sequentially performs generation of the first image signal in the first image signal generation unit 120 at a timing shifted for each row of the pixel array unit 11. The image generation unit 40 generates a first frame, which is an image based on the first image signal, and a second frame, which is an image based on the second image signal. The self-position estimation unit 50 generates a surrounding map from the first frame. The object detection unit 60 detects a target object from the second frame and generates target object information. The display unit 6 displays the surrounding map and the target object information. The control unit 70 can perform first frame generation control that causes the pixel control unit 30 to control global shutter control and causes the image generation unit 40 to generate the first frame, surrounding map generation control that causes the self-position estimation unit 50 to generate the surrounding map, second frame generation control that causes the pixel control unit 30 to control local shutter control and causes the image generation unit 40 to generate the second frame, target object detection control that causes the object detection unit 60 to generate the target object information, and display control that causes the display unit 6 to display the surrounding map and the target object information. As a result, it is possible to perform switching between imaging of the local shutter method and imaging of the global shutter method in the pixel 100 according to an application.

The light receiving unit 110 may include a photoelectric conversion unit configured to perform photoelectric conversion of the incident light, a charge storage unit configured to store a charge generated by the photoelectric conversion, a charge transfer unit configured to transfer, to the charge storage unit, the charge generated by the photoelectric conversion during an exposure period, an amplification unit configured to output a voltage level corresponding to the charge stored in the charge storage unit, and a reset unit configured to reset the charge storage unit.

The light receiving unit 110 may output a signal level, which is the voltage level when the charge generated during the exposure period is stored in the charge storage unit, and a reset level, which is the voltage level after being reset by the reset unit, the signal level storage unit 130 may store each of the output signal level and the output reset level, the first image signal generation unit 120 may generate the first image signal corresponding to the stored signal level and the stored reset level, and the second image signal generation unit 150 may generate the second image signal corresponding to the output signal level and the output reset level. As a result, the reset level can be extracted as an offset.

The body wearable terminal may further include an image signal processing unit configured to perform processing of subtracting the first image signal corresponding to the reset level from the first image signal corresponding to the signal level and processing of subtracting the second image signal corresponding to the reset level from the second image signal corresponding to the signal level, in which the image generation unit 40 may generate the first frame based on the first image signal processed by the image signal processing unit, and may generate the second frame based on the second image signal processed by the image signal processing unit. As a result, an offset error of the signal level can be deleted.

The body wearable terminal may further include the inertial measurement unit 2 configured to generate movement information, which is information on movement of the body wearable terminal 1 of a user, in which the control unit 70 may further perform movement information generation control and surrounding map correction control, in which the movement information generation control causes the inertial measurement unit 2 to generate the movement information, and the surrounding map correction control corrects the surrounding map based on the generated movement information.

The control unit 70 may further perform movement detection control to detect movement of the target object.

Further, a plurality of the pixel array units 11 may be provided, the image generation unit 40 may generate the first frame and the second frame for each of the plurality of pixel array units 11, the self-position estimation unit 50 may generate the surrounding map from the first frame of each of the plurality of pixel array units 11, and the object detection unit 60 may detect the target object from the second frame of each of the plurality of pixel array units 11.

The body wearable terminal 1 of a user may be configured in a terminal device mounted on a head of a body, and the pixel array unit 11 may generate the first image signal and the second image signal based on a subject in a visual field direction of the body.

It is noted that the effects described in the present specification are merely examples and are not limited, and other effects may be obtained.

It is noted that the present technology can also have the following configurations.

(1)

A body wearable terminal comprising:
- a pixel array unit having pixels arranged therein in a two-dimensional matrix, the pixel including a light receiving unit configured to expose incident light and to output a voltage level corresponding to an exposure amount, a signal level storage unit configured to store the voltage level output from the light receiving unit, a first image signal generation unit configured to generate a first image signal, which is a signal corresponding to the voltage level stored in the signal level storage unit, and a second image signal generation unit configured to generate a second image signal, which is a signal corresponding to the voltage level output from the light receiving unit;
- a pixel control unit configured to perform a local shutter and a global shutter, wherein the local shutter sequentially performs, on the pixels, exposure of the incident light in the light receiving unit and generation of the second image signal in the second image signal generation unit based on the voltage level output after the exposure at a timing shifted for each row of the pixel array unit, and the global shutter simultaneously performs, on the pixels arranged in the pixel array unit, the exposure of the incident light in the light receiving unit and storage of the voltage level output after the exposure in the signal level storage unit, and sequentially performs generation of the first image signal in the first image signal generation unit at the timing shifted for each row of the pixel array unit;
- an image generation unit configured to generate a first frame, which is an image based on the first image signal, and a second frame, which is an image based on the second image signal;
- a self-position estimation unit configured to generate a surrounding map from the first frame;
- an object detection unit configured to detect a target object from the second frame so as to generate target object information;
- a display unit configured to display the surrounding map and the target object information; and
- a control unit configured to perform first frame generation control, surrounding map generation control, second frame generation control, target object detection control, and display control, wherein the first frame generation control causes the pixel control unit to control the global shutter and causes the image generation unit to generate the first frame, the surrounding map generation control causes the self-position estimation unit to generate the surrounding map, the second frame generation control causes the pixel control unit to control the local shutter and causes the image generation unit to generate the second frame, the target object detection control causes the object detection unit to generate the target object information, and the display control causes the display unit to display the surrounding map and the target object information.

(2)

The body wearable terminal according to the above (1), wherein the light receiving unit includes a photoelectric conversion unit configured to perform photoelectric conversion of the incident light, a charge storage unit configured to store a charge generated by the photoelectric conversion, a charge transfer unit configured to transfer, to the charge storage unit, the charge generated by the photoelectric conversion during an exposure period, an amplification unit configured to output a voltage level corresponding to the charge stored in the charge storage unit, and a reset unit configured to reset the charge storage unit.

(3)

The body wearable terminal according to the above (2), wherein
- the light receiving unit is configured to output a signal level, which is the voltage level when the charge generated during the exposure period is stored in the charge storage unit, and a reset level, which is the voltage level after being reset by the reset unit,
- the signal level storage unit is configured to store each of the output signal level and the output reset level,
- the first image signal generation unit is configured to generate the first image signal corresponding to the stored signal level and the stored reset level, and
- the second image signal generation unit is configured to generate the second image signal corresponding to the output signal level and the output reset level.

(4)

The body wearable terminal according to the above (3), further comprising an image signal processing unit configured to perform processing of subtracting the first image signal corresponding to the reset level from the first image signal corresponding to the signal level and processing of subtracting the second image signal corresponding to the reset level from the second image signal corresponding to the signal level, wherein
- the image generation unit is configured to generate the first frame based on the first image signal processed by the image signal processing unit and to generate the second frame based on the second image signal processed by the image signal processing unit.

(5)

The body wearable terminal according to any one of the above (1) to (4), further comprising a movement detection unit configured to generate movement information, which is information on movement of the body wearable terminal of a user, wherein
- the control unit is configured to further perform movement information generation control and surrounding map correction control, wherein the movement information generation control causes the movement detection unit to generate the movement information, and the surrounding map correction control corrects the surrounding map based on the generated movement information.

(6)

The body wearable terminal according to any one of the above (1) to (5), wherein the control unit is configured to further perform movement detection control so as to detect movement of the target object.

(7) The body wearable terminal according to any one of the above (1) to (6), wherein
a plurality of the pixel array units are provided,
the image generation unit is configured to generate the first frame and the second frame for each of the plurality of pixel array units,
the self-position estimation unit is configured to generate the surrounding map from the first frame of each of the plurality of pixel array units, and
the object detection unit is configured to detect the target object from the second frame of each of the plurality of pixel array units.

(8) The body wearable terminal according to any one of the above (1) to (7), wherein
the body wearable terminal of a user is configured in a terminal device mounted on a head of a body, and
the pixel array unit generates the first image signal and the second image signal based on a subject in a visual field direction of the body.

(9) An information processing system comprising:
a pixel array unit having pixels arranged therein in a two-dimensional matrix, the pixel including a light receiving unit configured to expose incident light and to output a voltage level corresponding to an exposure amount, a signal level storage unit configured to store the voltage level output from the light receiving unit, a first image signal generation unit configured to generate a first image signal, which is a signal corresponding to the voltage level stored in the signal level storage unit, and a second image signal generation unit configured to generate a second image signal, which is a signal corresponding to the voltage level output from the light receiving unit;
a pixel control unit configured to perform a local shutter and a global shutter, wherein the local shutter sequentially performs, on the pixels, exposure of the incident light in the light receiving unit and generation of the second image signal in the second image signal generation unit based on the voltage level output after the exposure at a timing shifted for each row of the pixel array unit, and the global shutter simultaneously performs, on the pixels arranged in the pixel array unit, the exposure of the incident light in the light receiving unit and storage of the voltage level output after the exposure in the signal level storage unit, and sequentially performs generation of the first image signal in the first image signal generation unit at the timing shifted for each row of the pixel array unit;
an image generation unit configured to generate a first frame, which is an image based on the first image signal, and a second frame, which is an image based on the second image signal;
a self-position estimation unit configured to generate a surrounding map from the first frame;
an object detection unit configured to detect a target object from the second frame so as to generate target object information;
a display unit configured to display the surrounding map and the target object information; and
a control unit configured to perform first frame generation control, surrounding map generation control, second frame generation control, target object detection control, and display control, wherein the first frame generation control causes the pixel control unit to control the global shutter and causes the image generation unit to generate the first frame, the surrounding map generation control causes the self-position estimation unit to generate the surrounding map, the second frame generation control causes the pixel control unit to control the local shutter and causes the image generation unit to generate the second frame, the target object detection control causes the object detection unit to generate the target object information, and the display control causes the display unit to display the surrounding map and the target object information.

(10) The information processing system according to the above (9), wherein the light receiving unit includes a photoelectric conversion unit configured to perform photoelectric conversion of the incident light, a charge storage unit configured to store a charge generated by the photoelectric conversion, a charge transfer unit configured to transfer, to the charge storage unit, the charge generated by the photoelectric conversion during an exposure period, an amplification unit configured to output a voltage level corresponding to the charge stored in the charge storage unit, and a reset unit configured to reset the charge storage unit.

(11) The information processing system according to the above (10), wherein
the light receiving unit is configured to output a signal level, which is the voltage level when the charge generated during the exposure period is stored in the charge storage unit, and a reset level, which is the voltage level after being reset by the reset unit,
the signal level storage unit is configured to store each of the output signal level and the output reset level,
the first image signal generation unit is configured to generate the first image signal corresponding to the stored signal level and the stored reset level, and
the second image signal generation unit is configured to generate the second image signal corresponding to the output signal level and the output reset level.

(12) The information processing system according to the above (11), further comprising an image signal processing unit configured to perform processing of subtracting the first image signal corresponding to the reset level from the first image signal corresponding to the signal level and processing of subtracting the second image signal corresponding to the reset level from the second image signal corresponding to the signal level, wherein the image generation unit is configured to generate the first frame based on the first image signal processed by the image signal processing unit and to generate the second frame based on the second image signal processed by the image signal processing unit.

(13) The information processing system according to any one of the above (9) to (12), further comprising a movement detection unit configured to generate movement information, which is information on movement of the information processing system of a user, wherein
the control unit is configured to further perform movement information generation control and surrounding map correction control, wherein the movement information generation control causes the movement detection unit to generate the movement information, and the surrounding map correction control corrects the surrounding map based on the generated movement information.

(14) The information processing system according to any one of the above (9) to (13), wherein the control unit is configured to further perform movement detection control so as to detect movement of the target object.

(15) The information processing system according to any one of the above (9) to (14), wherein
a plurality of the pixel array units are provided,
the image generation unit is configured to generate the first frame and the second frame for each of the plurality of pixel array units,
the self-position estimation unit is configured to generate the surrounding map from the first frame of each of the plurality of pixel array units, and
the object detection unit is configured to detect the target object from the second frame of each of the plurality of pixel array units.

(16) The information processing system according to any one of the above (9) to (15), wherein
the information processing system of a user is configured in a system mounted on a head of a body, and
the pixel array unit generates the first image signal and the second image signal based on a subject in a visual field direction of the body.

REFERENCE SIGNS LIST

1 BODY WEARABLE TERMINAL
2 INERTIAL MEASUREMENT UNIT
3, 3a, 3b IMAGING ELEMENT
6 DISPLAY UNIT
11 PIXEL ARRAY UNIT
12 VERTICAL DRIVE UNIT
13 COLUMN SIGNAL PROCESSING UNIT
30 PIXEL CONTROL UNIT
40 IMAGE GENERATION UNIT
50 SELF-POSITION ESTIMATION UNIT
60 OBJECT DETECTION UNIT
70 CONTROL UNIT
100 PIXEL
110 LIGHT RECEIVING UNIT
111, 511 PHOTOELECTRIC CONVERSION UNIT
112, 512 CHARGE STORAGE UNIT
114 CHARGE DISCHARGING UNIT
115, 515 CHARGE TRANSFER UNIT
116, 516 FIRST RESET UNIT
118, 518 FIRST AMPLIFICATION UNIT
119 FIRST SELECTION UNIT
120 FIRST IMAGE SIGNAL GENERATION UNIT
121, 521 SECOND RESET UNIT
122, 522 SECOND AMPLIFICATION UNIT
123 SECOND SELECTION UNIT
130 SIGNAL LEVEL STORAGE UNIT
131, 531 FIRST CAPACITIVE ELEMENT
132, 532 SECOND CAPACITIVE ELEMENT
135 FIRST SWITCH ELEMENT
136 SECOND SWITCH ELEMENT
150 SECOND IMAGE SIGNAL GENERATION UNIT
151, 551 MOS TRANSISTOR
523 SELECTION UNIT
539 SAMPLING UNIT

The invention claimed is:

1. A body wearable terminal comprising:
a pixel array unit having pixels arranged therein in a two-dimensional matrix, the pixel including a light receiving unit configured to expose incident light and to output a voltage level corresponding to an exposure amount, a signal level storage unit configured to store the voltage level output from the light receiving unit, a first image signal generation unit configured to generate a first image signal, which is a signal corresponding to the voltage level stored in the signal level storage unit, and a second image signal generation unit configured to generate a second image signal, which is a signal corresponding to the voltage level output from the light receiving unit;
a pixel control unit configured to perform a local shutter and a global shutter, wherein the local shutter sequentially performs, on the pixels, exposure of the incident light in the light receiving unit and generation of the second image signal in the second image signal generation unit based on the voltage level output after the exposure at a timing shifted for each row of the pixel array unit, and the global shutter simultaneously performs, on the pixels arranged in the pixel array unit, the exposure of the incident light in the light receiving unit and storage of the voltage level output after the exposure in the signal level storage unit, and sequentially performs generation of the first image signal in the first image signal generation unit at the timing shifted for each row of the pixel array unit;
an image generation unit configured to generate a first frame, which is an image based on the first image signal, and a second frame, which is an image based on the second image signal;
a self-position estimation unit configured to generate a surrounding map from the first frame;
an object detection unit configured to detect a target object from the second frame so as to generate target object information;
a display unit configured to display the surrounding map and the target object information; and
a control unit configured to perform first frame generation control, surrounding map generation control, second frame generation control, target object detection control, and display control, wherein the first frame generation control causes the pixel control unit to control the global shutter and causes the image generation unit to generate the first frame, the surrounding map generation control causes the self-position estimation unit to generate the surrounding map, the second frame generation control causes the pixel control unit to control the local shutter and causes the image generation unit to generate the second frame, the target object detection control causes the object detection unit to generate the target object information, and the display control causes the display unit to display the surrounding map and the target object information.

2. The body wearable terminal according to claim 1, wherein the light receiving unit includes a photoelectric conversion unit configured to perform photoelectric conversion of the incident light, a charge storage unit configured to store a charge generated by the photoelectric conversion, a charge transfer unit configured to transfer, to the charge storage unit, the charge generated by the photoelectric conversion during an exposure period, an amplification unit configured to output a voltage level corresponding to the charge stored in the charge storage unit, and a reset unit configured to reset the charge storage unit.

3. The body wearable terminal according to claim 2, wherein
the light receiving unit is configured to output a signal level, which is the voltage level when the charge generated during the exposure period is stored in the charge storage unit, and a reset level, which is the voltage level after being reset by the reset unit,
the signal level storage unit is configured to store each of the output signal level and the output reset level,
the first image signal generation unit is configured to generate the first image signal corresponding to the stored signal level and the stored reset level, and
the second image signal generation unit is configured to generate the second image signal corresponding to the output signal level and the output reset level.

4. The body wearable terminal according to claim 3, further comprising an image signal processing unit configured to perform processing of subtracting the first image signal corresponding to the reset level from the first image signal corresponding to the signal level and processing of subtracting the second image signal corresponding to the reset level from the second image signal corresponding to the signal level, wherein
the image generation unit is configured to generate the first frame based on the first image signal processed by the image signal processing unit and to generate the second frame based on the second image signal processed by the image signal processing unit.

5. The body wearable terminal according to claim 1, further comprising a movement detection unit configured to generate movement information, which is information on movement of the body wearable terminal of a user, wherein
the control unit is configured to further perform movement information generation control and surrounding map correction control, wherein the movement information generation control causes the movement detection unit to generate the movement information, and the surrounding map correction control corrects the surrounding map based on the generated movement information.

6. The body wearable terminal according to claim 1, wherein the control unit is configured to further perform movement detection control so as to detect movement of the target object.

7. The body wearable terminal according to claim 1, wherein
a plurality of the pixel array units are provided,
the image generation unit is configured to generate the first frame and the second frame for each of the plurality of pixel array units,
the self-position estimation unit is configured to generate the surrounding map from the first frame of each of the plurality of pixel array units, and
the object detection unit is configured to detect the target object from the second frame of each of the plurality of pixel array units.

8. The body wearable terminal according to claim 1, wherein
the body wearable terminal of a user is configured in a terminal device mounted on a head of a body, and
the pixel array unit generates the first image signal and the second image signal based on a subject in a visual field direction of the body.

9. An information processing system comprising:
a pixel array unit having pixels arranged therein in a two-dimensional matrix, the pixel including a light receiving unit configured to expose incident light and to output a voltage level corresponding to an exposure amount, a signal level storage unit configured to store the voltage level output from the light receiving unit, a first image signal generation unit configured to generate a first image signal, which is a signal corresponding to the voltage level stored in the signal level storage unit, and a second image signal generation unit configured to generate a second image signal, which is a signal corresponding to the voltage level output from the light receiving unit;
a pixel control unit configured to perform a local shutter and a global shutter, wherein the local shutter sequentially performs, on the pixels, exposure of the incident light in the light receiving unit and generation of the second image signal in the second image signal generation unit based on the voltage level output after the exposure at a timing shifted for each row of the pixel array unit, and the global shutter simultaneously performs, on the pixels arranged in the pixel array unit, the exposure of the incident light in the light receiving unit and storage of the voltage level output after the exposure in the signal level storage unit, and sequentially performs generation of the first image signal in the first image signal generation unit at the timing shifted for each row of the pixel array unit;
an image generation unit configured to generate a first frame, which is an image based on the first image signal, and a second frame, which is an image based on the second image signal;
a self-position estimation unit configured to generate a surrounding map from the first frame;
an object detection unit configured to detect a target object from the second frame so as to generate target object information;
a display unit configured to display the surrounding map and the target object information; and
a control unit configured to perform first frame generation control, surrounding map generation control, second frame generation control, target object detection control, and display control, wherein the first frame generation control causes the pixel control unit to control the global shutter and causes the image generation unit to generate the first frame, the surrounding map generation control causes the self-position estimation unit to generate the surrounding map, the second frame generation control causes the pixel control unit to control the local shutter and causes the image generation unit to generate the second frame, the target object detection control causes the object detection unit to generate the target object information, and the display control causes the display unit to display the surrounding map and the target object information.

10. The information processing system according to claim 9, wherein the light receiving unit includes a photoelectric conversion unit configured to perform photoelectric conversion of the incident light, a charge storage unit configured to store a charge generated by the photoelectric conversion, a charge transfer unit configured to transfer, to the charge storage unit, the charge generated by the photoelectric conversion during an exposure period, an amplification unit configured to output a voltage level corresponding to the charge stored in the charge storage unit, and a reset unit configured to reset the charge storage unit.

11. The information processing system according to claim 10, wherein
the light receiving unit is configured to output a signal level, which is the voltage level when the charge generated during the exposure period is stored in the charge storage unit, and a reset level, which is the voltage level after being reset by the reset unit,
the signal level storage unit is configured to store each of the output signal level and the output reset level,
the first image signal generation unit is configured to generate the first image signal corresponding to the stored signal level and the stored reset level, and
the second image signal generation unit is configured to generate the second image signal corresponding to the output signal level and the output reset level.

12. The information processing system according to claim 11, further comprising an image signal processing unit configured to perform processing of subtracting the first image signal corresponding to the reset level from the first image signal corresponding to the signal level and processing of subtracting the second image signal corresponding to the reset level from the second image signal corresponding to the signal level, wherein
the image generation unit is configured to generate the first frame based on the first image signal processed by the image signal processing unit and to generate the second frame based on the second image signal processed by the image signal processing unit.

13. The information processing system according to claim 9, further comprising a movement detection unit configured to generate movement information, which is information on movement of the information processing system of a user, wherein
the control unit is configured to further perform movement information generation control and surrounding map correction control, wherein the movement information generation control causes the movement detection unit to generate the movement information, and the surrounding map correction control corrects the surrounding map based on the generated movement information.

14. The information processing system according to claim 9, wherein the control unit is configured to further perform movement detection control so as to detect movement of the target object.

15. The information processing system according to claim 9, wherein
a plurality of the pixel array units are provided,
the image generation unit is configured to generate the first frame and the second frame for each of the plurality of pixel array units,
the self-position estimation unit is configured to generate the surrounding map from the first frame of each of the plurality of pixel array units, and
the object detection unit is configured to detect the target object from the second frame of each of the plurality of pixel array units.

16. The information processing system according to claim 9, wherein
the information processing system of a user is configured in a system mounted on a head of a body, and
the pixel array unit generates the first image signal and the second image signal based on a subject in a visual field direction of the body.

* * * * *